(12) United States Patent
Nagai et al.

(10) Patent No.: US 8,665,787 B2
(45) Date of Patent: Mar. 4, 2014

(54) RADIO APPARATUS WHICH COMMUNICATES WITH OTHER RADIO APPARATUSES AND COMMUNICATION SYSTEM

(75) Inventors: Makoto Nagai, Kakamigahara (JP); Ken Nakaoka, Ichinomiya (JP); Kiyoshige Ito, Gifu (JP); Yumi Okamura, Mizuho (JP)

(73) Assignee: Hera Wireless S.A., Luxembourg (LU)

( * ) Notice: Subject to any disclaimer, the term of this patent is extended or adjusted under 35 U.S.C. 154(b) by 349 days.

(21) Appl. No.: 13/002,620

(22) PCT Filed: Jun. 30, 2009

(86) PCT No.: PCT/JP2009/003031

§ 371 (c)(1),
(2), (4) Date: Mar. 31, 2011

(87) PCT Pub. No.: WO2010/001593

PCT Pub. Date: Jan. 7, 2010

(65) Prior Publication Data

US 2011/0170484 A1    Jul. 14, 2011

(30) Foreign Application Priority Data

Jul. 4, 2008  (JP) ................................ 2008-175801
Jul. 4, 2008  (JP) ................................ 2008-175802
Jul. 4, 2008  (JP) ................................ 2008-175803

(51) Int. Cl.
*H04W 4/00* (2009.01)
(52) U.S. Cl.
USPC ........................... 370/328; 370/401; 709/221
(58) Field of Classification Search
None
See application file for complete search history.

(56) References Cited

U.S. PATENT DOCUMENTS

2004/0073361 A1* 4/2004 Tzamaloukas et al. ........ 701/210
2006/0029024 A1* 2/2006 Zeng et al. .................... 370/335
2006/0242412 A1* 10/2006 Jung et al. ..................... 713/171

(Continued)

FOREIGN PATENT DOCUMENTS

JP   08-298687   11/1996
JP   10-145276    5/1998

(Continued)

OTHER PUBLICATIONS

International Search Report issued in International Patent Application No. PCT/JP2009/003031, mailed Oct. 6, 2009.

(Continued)

*Primary Examiner* — Bob Phunkulh
(74) *Attorney, Agent, or Firm* — DC Patent Lawyers, PLLC

(57) ABSTRACT

A data processing unit selects either one of a base station mode and a terminal mode so as to perform communications using packet signals. The base station mode is a mode in which a packet signal, containing data indicating that an initial source and a final destination are not its own radio apparatus, is to be communicated; the terminal mode is a mode in which a packet signal, containing data indicating that the initial source or the final destination is its own radio apparatus, is to be communicated. A control unit starts the radio apparatus by setting the data processing unit in the terminal mode. When a packet signal, which has been transmitted from another radio apparatus and which contains broadcast information, has not been received before a certain period of time elapses after the start, the control unit switches the mode of the data processing unit to the base station mode.

7 Claims, 14 Drawing Sheets

(56) References Cited

U.S. PATENT DOCUMENTS

| | | | |
|---|---|---|---|
| 2007/0064645 A1* | 3/2007 | Tanaka et al. | 370/329 |
| 2007/0230441 A1* | 10/2007 | Sethi et al. | 370/352 |
| 2008/0025512 A1* | 1/2008 | Nakajima | 380/270 |
| 2008/0026788 A1* | 1/2008 | Hamada | 455/552.1 |

FOREIGN PATENT DOCUMENTS

| | | |
|---|---|---|
| JP | 11-205856 | 7/1999 |
| JP | 2001-136177 A | 5/2001 |
| JP | 2002-190806 | 7/2002 |
| JP | 2004-129042 A | 4/2004 |
| JP | 2006-197264 A | 7/2006 |
| JP | 2008-060757 A | 3/2008 |
| WO | 2005-109764 A1 | 11/2005 |

OTHER PUBLICATIONS

International Preliminary Report on Patentability and Written Opinion of the International Searching Authority issued in International Patent Application No. PCT/JP2009/003031, mailed Feb. 17, 2011.

Masahiro Morikura et al., "802,11 High-Speed wireless LAN text book," pp. 60-63, Impress, Inc., Jul. 21, 2005, Japan, with English Translation.

* cited by examiner

100

100

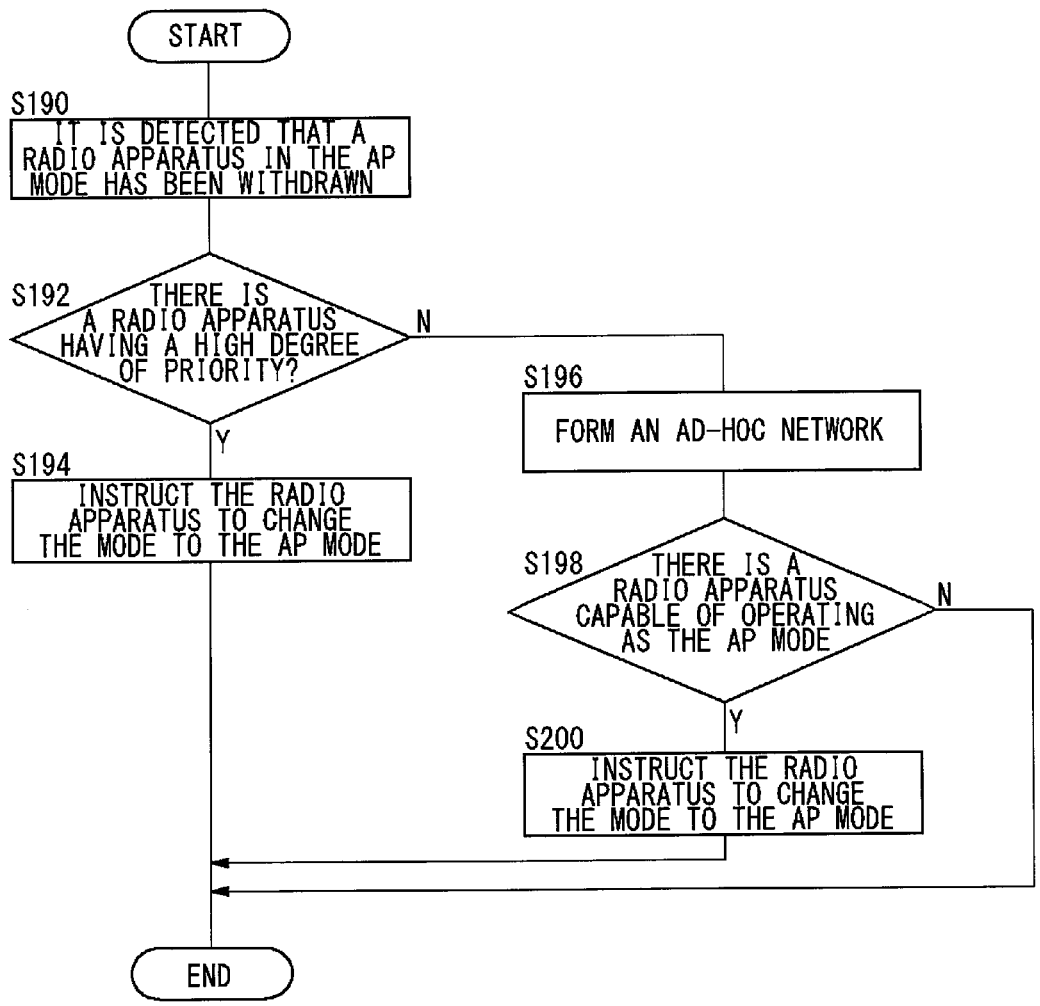

RADIO APPARATUS WHICH COMMUNICATES WITH OTHER RADIO APPARATUSES AND COMMUNICATION SYSTEM

RELATED APPLICATIONS

This application is the U.S. National Phase under 35 U.S.C. §371 of International Application No. PCT/JP2009/003031, filed on Jun. 30, 2009, which in turn claims the benefit of Japanese Application No. 2008-175801, filed on Jul. 4, 2008, Japanese Application No. 2008-175802, filed on Jul. 4, 2008 and Japanese Application No. 2008-175803, filed on Jul. 4, 2008 the disclosures of which Applications are incorporated by reference herein.

TECHNICAL FIELD

The present invention relates to a communication technology, and it particularly relates to a radio apparatus, which communicates with other radio apparatuses, and a communication system.

BACKGROUND TECHNOLOGY

Wireless LAN (Local Area Network) complying with the standards, such as IEEE 802.11, is in wide use in recent years. Such wireless LAN includes two kinds of network configurations. One is an infrastructure mode and the other is an ad-hoc mode. It further includes a network configuration called a wireless distribution system (WDS). The infrastructure mode is configured by a base station apparatus and terminal apparatuses located within a cell site, which is formed by said base station apparatus.

A network formed by combining a base station apparatus and a plurality of terminal apparatuses is called a basic service set (BSS). Generally, the base station apparatus, which connects to a wired backbone network, relays packet signals between the backbone network and the terminal apparatuses. Further, the base station apparatus also relays the packet signals between the terminal apparatuses. On the other hand, the ad-hoc mode does not include the base station apparatus and is configured by terminal apparatuses only. Generally, the terminal apparatuses do not have the function of relaying the packet signals but directly transmit the packet signals between them. Also, WDS relays the packet signals even between base station apparatuses (See Non-patent Document 1, for instance).

PRIOR ART DOCUMENTS

Non-Patent Documents

Non-Patent Document 1

Masahiro MORIKURA and Shuji KUBOTA, "802.11 High-Speed wireless LAN text book", pp. 60-63, Impress, Inc., Jan. 1, 2005, Japan

DISCLOSURE OF THE INVENTION

Problems to be Solved by the Invention

Generally, each base station apparatus has a function as a base station apparatus (hereinafter referred to as "base station mode"), whereas each terminal apparatus has a function as a terminal apparatus (hereinafter referred to as "terminal mode"). That is, a base station apparatus and a terminal apparatus are each configured as a completely different and separate apparatus. On the other hand, a radio apparatus differing from the aforementioned configurations is proposed. In such a radio apparatus, both the base station mode and the terminal mode are implemented and either one of the modes is selected. Accordingly, in a wireless network formed by such radio apparatuses, a radio apparatus that is to select the base station mode is set arbitrarily. However, in order to maintain the stable communications in the wireless network, the base station mode or the terminal mode must be set properly in each radio apparatus.

The present invention has been made in view of the foregoing circumstances, and a purpose thereof is to provide a technology by which either one of the base station mode and the terminal mode is set properly in a radio apparatus having the two modes.

Means for Solving the Problems

In order to resolve the above problems, a radio apparatus according to one embodiment of the present invention communicates with another radio apparatus and it comprises: a communication unit configured to select either one of a base station mode and a terminal mode so as to perform a communication using packet signals, the base station mode being such that a packet signal containing data indicating that an initial source and a final destination are not the own radio apparatus is to be communicated, and the terminal mode being such that a packet signal containing data indicating that the initial source or the final destination is the own radio apparatus is to be communicated; and a control unit configured to control an operation related to the base station mode and the terminal mode in the communication unit. When the radio apparatus is started, the control unit selects either a first mode or a second mode, the first mode being such that the base station mode or the terminal mode is used fixedly and the second mode being such that the base station mode and the terminal mode are used by switching the mode therebetween.

Another embodiment of the present invention relates also to a radio apparatus. The apparatus communicates with another radio apparatus and it comprises: a communication unit configured to select either one of a base station mode and a terminal mode so as to perform a communication using packet signals, the base station mode being such that a packet signal containing data indicating that an initial source and a final destination are not the own radio apparatus is to be communicated, and the terminal mode being such that a packet signal containing data indicating that the initial source or the final destination is the own radio apparatus is to be communicated; and a control unit configured to start the radio apparatus by setting the communication unit to the terminal mode. When the control unit does not receive a packet signal, which is transmitted from the another radio apparatus and which contains broadcast information, via the communication unit before a predetermined duration of time has elapsed after the start of the radio apparatus, the control unit switches the mode of the communication unit to the base station mode.

Still another embodiment of the present invention relates also to a radio apparatus. The apparatus communicates with another radio apparatus and it comprises: a communication unit configured to select either one of a base station mode and a terminal mode so as to perform a communication using packet signals, the base station mode being such that a packet signal containing data indicating that an initial source and a final destination are not the own radio apparatus is to be communicated, and the terminal mode being such that a packet signal containing data indicating that the initial source or the final destination is the own radio apparatus is to be communicated; and a control unit configured to control an operation related to the base station mode and the terminal mode in the communication unit. The control unit sets an operation mode in the communication unit, via the communication unit, based on a result of information exchange, on the operation mode in the communication mode, conducted between the radio apparatus and the another radio apparatus.

Still another embodiment of the present invention relates also to a radio apparatus. The apparatus communicates with another radio apparatus and it comprises: a communication unit configured to select either one of a base station mode and a terminal mode so as to perform a communication using packet signals, the base station mode being such that a packet signal containing data indicating that an initial source and a final destination are not the own radio apparatus is to be communicated, and the terminal mode being such that a packet signal containing data indicating that the initial source or the final destination is the own radio apparatus is to be communicated; a control unit configured to control an operation related to the base station mode and the terminal mode in the communication unit; and a detector configured to detect a remaining amount of battery included in the radio apparatus, when the control unit sets the communication unit to the base station mode, wherein when the remaining amount of battery included in the radio apparatus has become lower than a threshold value, the detector notifies the control unit of the detection result, wherein when a notification is received from the detector, the control unit instructs the another radio apparatus to switch to the base station mode, via the communication unit, and the control unit instructs the communication unit to switch to the terminal mode.

A communication system according to one embodiment of the present invention comprises: a first network including a first radio apparatus and a plurality of first terminal apparatuses; and a second network including a second radio apparatus and a plurality of second terminal apparatuses. The first radio apparatus and the second radio apparatus each has a base station mode and a terminal mode, and each selects the base station mode, the base station mode being such that a packet signal containing data indicating that an initial source and a final destination are not the own first or second radio apparatus itself is to be communicated, and the terminal mode being such that a packet signal containing data indicating that the initial source or the final destination is the own first or second radio apparatus itself is to be communicated, and wherein when at least one of the first radio apparatus and the second radio apparatus senses proximity of the other, the second radio apparatus integrates the second network into the first network by switching the base station mode to the terminal mode.

Another embodiment of the present invention relates also to a communication system. The communication system comprises: a first radio apparatus having a base station mode and a terminal mode, the first radio apparatus having selected the base station mode, the base station mode being such that a packet signal containing data indicating that an initial source and a final destination are not the own first radio apparatus is to be communicated, and the terminal mode being such that a packet signal containing data indicating that the initial source or the final destination is the own first radio apparatus is to be communicated; a second radio apparatus having a base station mode and a terminal mode, the second radio apparatus having selected the terminal mode, the base station mode being such that a packet signal containing data indicating that an initial source and a final destination are not the own second radio apparatus is to be communicated, and the terminal mode being such that a packet signal containing data indicating that the initial source or the final destination is the own second radio apparatus is to be communicated; and a plurality of terminal apparatuses. When the size of a network comprised of the first radio apparatus, the second radio apparatus and the plurality of terminal apparatuses becomes larger than a threshold value, the first radio apparatus instructs the second radio apparatus to switch the mode from the terminal mode to the base station mode, and instructs some of the plurality of terminal apparatuses and the second radio apparatus to form another network.

Still another embodiment of the present invention relates also to a communication system. The communication system comprises: a first radio apparatus having a base station mode and a terminal mode, the first radio apparatus having selected the base station mode, the base station mode being such that a packet signal containing data indicating that an initial source and a final destination are not the own first radio apparatus is to be communicated, and the terminal mode being such that a packet signal containing data indicating that the initial source or the final destination is the own first radio apparatus is to be communicated; and a plurality of second radio apparatuses each having a base station mode and a terminal mode, the second radio apparatuses having selected the terminal mode, the base station mode being such that a packet signal containing data indicating that an initial source and a final destination are not the own second radio apparatus is to be communicated, and the terminal mode being such that a packet signal containing data indicating that the initial source or the final destination is the own second radio apparatus is to be communicated. When the plurality of second radio apparatuses detect that the first radio apparatus has withdrawn from a network formed by the first radio apparatus and the plurality of second radio apparatuses, the mode of one of the plurality of second radio apparatuses is changed from the terminal mode to the base station mode.

Optional combinations of the aforementioned constituting elements, and implementations of the invention in the form of methods, apparatuses, systems, recording media, computer programs and so forth may also be practiced as additional modes of the present invention.

Effect of the Invention

The present invention properly sets either one of the base station mode and the terminal mode in a radio apparatus having the two modes.

BRIEF DESCRIPTION OF THE DRAWINGS

FIG. 14 is a flowchart showing a setting procedure in a communication system according to an exemplary embodiment of the present invention.

BEST MODE FOR CARRYING OUT THE INVENTION

An outline of the present invention will be given before a specific description thereof. An exemplary embodiment of the present invention relates to a communication system that performs communications in a network formed by a plurality of radio apparatuses. Each radio apparatus, which is compatible with both a base station mode and a terminal mode, selects either one of the two modes and uses the thus selected mode. As described earlier, the mode must be selected properly and there are a plurality of kinds of situations where the selection is made. Thus, a processing suitable to each situation must be carried out. Hereinbelow, a general summary of a communication system is explained in Section 1. Then a description is given of each situation in Sections 2 to 6. Note that, in addition to the aforementioned radio apparatuses, the communication system may include a normal base station apparatus and a normal terminal apparatus but they will be omitted, otherwise required, in the following description. Also, in the following, a radio apparatus compatible with both the base station mode and the terminal mode is called "radio apparatus"; a radio apparatus for exclusive use in a base station apparatus is called "base station apparatus", whereas a radio apparatus for exclusive use in a terminal apparatus is called "terminal apparatus". At the same time, a radio apparatus for use in a base station apparatus or a radio apparatus for use in a terminal apparatus may be sometimes called "radio apparatus" as well.

1. Summary of Operations

A communication system is compatible with an infrastructure mode, an ad-hoc mode and WDS (communications between access points (APs)). Also, the communication system is compatible with a mode in which a radio apparatus, which is compatible with both the base station mode and the terminal mode, selects either one of the base station mode and the terminal mode and then performs communications; this mode is hereinafter referred to as "switching mode". A brief description is first given of the configuration of the infrastructure mode, the ad-hoc mode and the switching mode, respectively, as the configurations of the communication system.

Figure 1A:
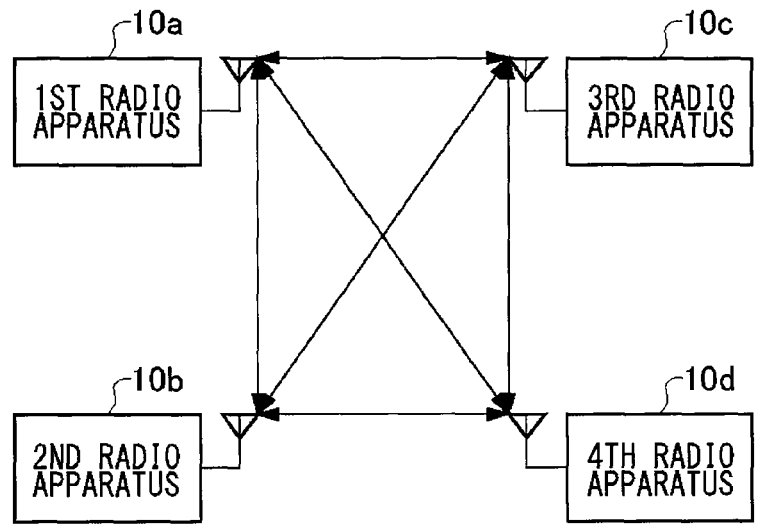
FIGS. 1A and 1B each illustrates a configuration of a communication system according to an exemplary embodiment of the present invention.
Figure 1B:
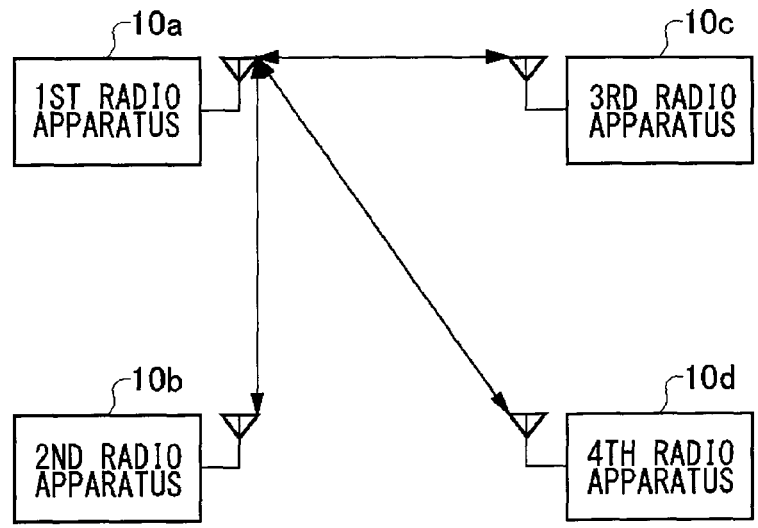

FIGS. 1A and 1B each illustrates a configuration of a communication system 100 according to an exemplary embodiment of the present invention. A communication system 100 includes a first radio apparatus 10*a*, a second radio apparatus 10*b*, a third radio apparatus 10*c*, and a fourth radio apparatus 10*d*, which are generically referred to as "radio apparatus 10" or "radio apparatuses 10". FIG. 1A illustrates a case where the four radio apparatuses 10 are operating in the ad-hoc mode. Each radio apparatus 10 selects the terminal mode or is a terminal apparatus itself. Though known art may be used in a communication processing in an ad-hoc network and therefore the description thereof is omitted here, a radio apparatus 10 directly transmits packet signals to another radio apparatus 10 to be communicated therewith.

FIG. 1B illustrates a case where the four radio apparatuses 10 are operating in the infrastructure mode. The first radio apparatus 10*a* selects the base station mode or is a base station apparatus itself. On the other hand, the second radio apparatus 10*b*, the third radio apparatus 10*c*, and the fourth radio apparatus 10*d* each selects the terminal mode or are each a terminal apparatus itself. In the communications between the radio apparatuses 10 in the terminal mode, the packet signals are relayed by a radio apparatus 10 in the base station mode. For example, if the packet signals are to be transmitted from the second radio apparatus 10*b* to the fourth radio apparatus 10*d*, the second radio apparatus 10*b* first transmits the packet signals to the first radio apparatus 10*a*. The first radio apparatus 10*a* transmits the received packet signals to the fourth radio apparatus 10*d*.

In other words, the radio apparatus 10 in the base station mode or the base station apparatus itself transmits and receives packet signals containing data indicating that an initial source and a final destination are not the own radio apparatus itself. In the case of the aforementioned example, the first source of data is the second radio apparatus 10*b*, whereas the final destination of data is the fourth radio apparatus 10*d*; thus the first radio apparatus 10*a* in the base station mode is included in neither of them. On the other hand, the radio apparatus 10 in the terminal mode or the terminal apparatus itself transmits and receives packet signals containing data indicating that the initial source or the final destination is the own radio apparatus itself. In the case of the aforementioned example, the packet signals transmitted from the second radio apparatus 10*b* contain data indicating that the second radio apparatus 10*b* is the initial source, and the packet signals received by the fourth radio apparatus 10*d* contain data indicating that the fourth radio apparatus 10*d* is the final destination. The same thing applies to the ad-hoc network illustrated in FIG. 1A.

Figure 2A:
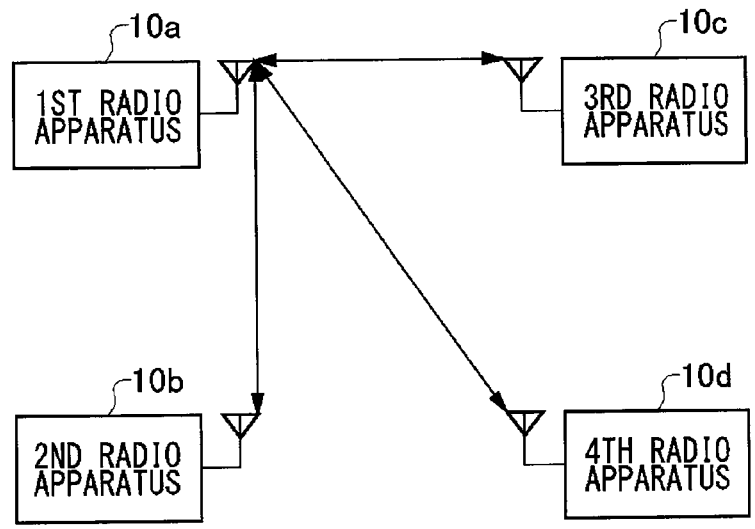
FIGS. 2A and 2B each illustrates another configuration of a communication system according to an exemplary embodiment of the present invention.
Figure 2B:
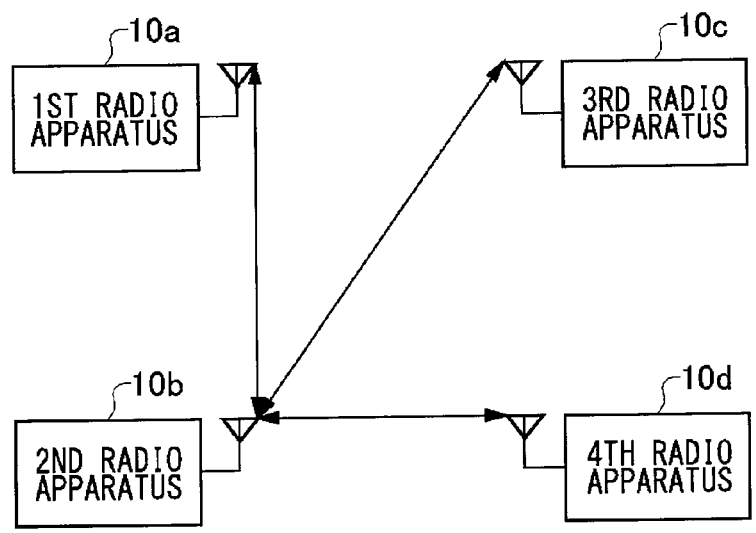

FIGS. 2A and 2B each illustrates another configuration of the communication system 100 according to an exemplary embodiment of the present invention. FIGS. 2A and 2B illustrate a case where the four radio apparatuses 10 are operating in a switching mode. In FIG. 2A, the first radio apparatus 10*a* operates in the base station mode, whereas the second radio apparatus 10*b*, the third radio apparatus 10*c* and the fourth radio apparatus 10*d* operate in the terminal mode. On the other hand, in FIG. 2B, the second radio apparatus 10*b* operates in the base station mode, whereas the first radio apparatus 10*a*, the third radio apparatus 10*c* and the fourth radio apparatus 10*d* operate in the terminal mode. In the switching mode, the state as illustrated in FIG. 2A and the state as illustrated in FIG. 2B are switched between them as appropriate. It is noted here that the time duration during which and the timing at which the switching is to be performed may be optional. Note also that the state as illustrated in FIG. 2A is equivalent to that as illustrated in FIG. 1B. That is, in the switching mode, the processing similar to that in the infrastructure mode is performed with predetermined timing, and only the difference therebetween is whether a radio apparatus 10 serving as the base station apparatus is to be changed or not.

2. The Setting of Mode at Power-on

An outline is first described. Where a radio apparatus 10 is equipped with the infrastructure mode, the ad-hoc mode and the switching mode, the radio apparatus 10 needs to select a mode from among these operation modes at the power-on. Generally, at the time the apparatus is activated, a user wishes to use a certain operation mode. Accordingly, an operation mode reflecting the user's intention is preferably selected. If the radio apparatus 10 is activated in the switching mode, the radio apparatus 10 must select either the base station mode or the terminal mode. Since there is a possibility that there may already exist another radio apparatus 10 operating in the base station mode or the terminal mode on the periphery of said radio apparatus 10, the selection of a mode is preferably determined based on the mode used by the another radio apparatus 10 located around said radio apparatus 10. In order to cope with this, the radio apparatus 10 according to the exemplary embodiment carries out the following operations.

The radio apparatus 10 receives an instruction as to the selection of any one of the infrastructure mode, the ad-hoc mode and the switching mode from the user before the power-on. Then the radio apparatus 10 selects the operation mode to be used, in accordance with the instruction received. The radio apparatus 10 performs the setting so that the radio apparatus 10 can be operated in the selected operation mode. If the radio apparatus 10 is activated in the switching mode, it will execute the terminal mode in an initial state. In other words, the radio apparatus 10 is started to function as a terminal apparatus. Then, the radio apparatus 10 receives a broadcast signal, namely a beacon signal, from other radio apparatuses 10 over a certain period of time. If no such beacon signals are received, the mode used in the radio apparatus 10 will be switched to the base station mode from the terminal mode because it is estimated that there is no radio apparatus 10 in the base station mode on the periphery of said radio apparatus 10.

Figure 3:
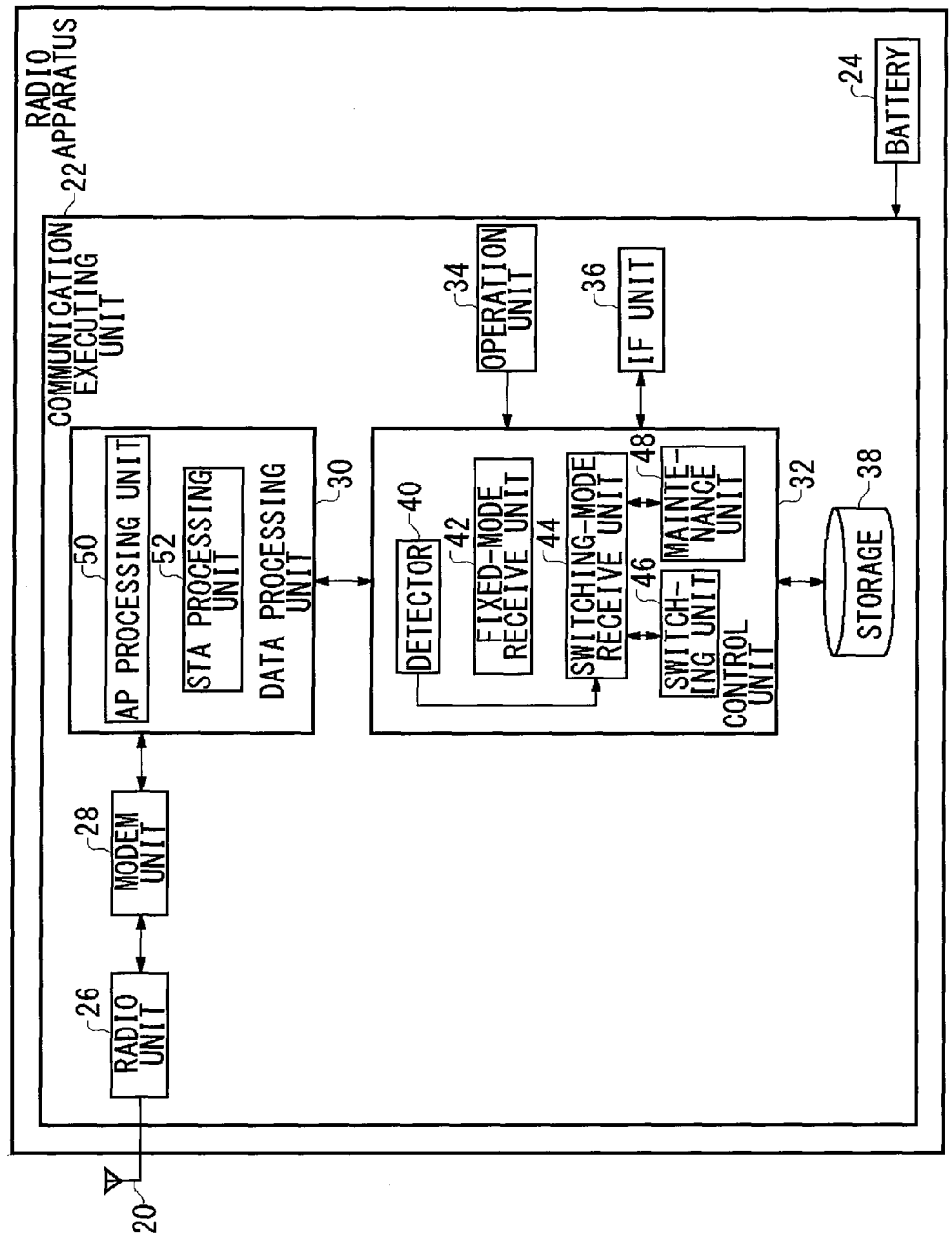
FIG. 3 illustrates a structure of a radio apparatus according to an exemplary embodiment of the present invention.

FIG. 3 illustrates a structure of a radio apparatus 10 according to an exemplary embodiment of the present invention. The radio apparatus 10 includes an antenna 20, a communication executing unit 22, and a battery 24. The communication executing unit 22 includes a radio unit 26, a modem unit 28, a data processing unit 30, a control unit 32, an operation unit 34, an IF unit 36, and a storage 38. The data processing unit 30 includes an AP processing unit 50, and an STA processing unit 52. The control unit 32 includes a detector 40, a fixed-mode receive unit 42, a switching-mode receive unit 44, a switching unit 46, and a maintenance unit 48.

The radio unit 26 communicates with other radio apparatuses 10, using the packet signals. As a receiving processing, the radio unit 26 carries out frequency conversion of the radiofrequency packet signals received via the antenna 20 so as to generate baseband packet signals. Then the radio unit 26 outputs the baseband packet signals to the modem unit 28. The baseband packet signal, which is composed of in-phase components and quadrature components, shall generally be transmitted by two signal lines. For the clarity of Figure, those are presented here by a single signal line. An LNA (Low Noise Amplifier), an mixer, an AGC unit and an A-D conversion unit are also included in the radio unit 26.

As a transmission processing, the radio unit 26 carries out frequency conversion of the baseband packet signals inputted from the modem unit 28 so as to generate radiofrequency packet signals. Then the radio unit 26 transmits the radio frequency packet signals via the antenna 20. A PA (Power Amplifier), a mixer and a D-A conversion unit are also included in the radio unit 26.

As a receiving processing, the modem unit 28 demodulates the packet signals fed from the radio unit 26. Then the modem unit 28 outputs the demodulation result to the data processing unit 30. As a transmission processing, the modem unit 28 modulates the data sent from the data processing unit 30. Then the modem unit 28 outputs the modulation result to the radio unit 26 as baseband packet signals. If the radio apparatus 10 is compatible with the IEEE 802.11a or like standard which is based on the OFDM scheme, the modem unit 28 will also perform FFT (Fast Fourier Transform) as a receiving processing, and it will also perform IFFT (Inverse Fast Fourier Transform) as a transmission processing.

If the radio apparatus 10 is compatible with a spread spectrum scheme (e.g., IEEE 802.11b), the modem unit 28 will also perform inverse spreading as a receiving processing and also perform spreading as a transmission processing. If the radio apparatus 10 is compatible with a MIMO (Multiple-Input Multiple-Output) scheme (e.g., IEEE 802.11n), the modem unit 28 will also perform adaptive array signal processing as a receiving processing and also distribute data streams to multiple streams as a transmission processing.

The AP processing unit 50 carries out the processing for the aforementioned base station mode. Known art used for a base station apparatus may be employed as the processing for the base station mode and therefore the description thereof is omitted here. However, as described above, the AP processing unit 50 at least relays the communications between the not-shown radio apparatuses 10 in the terminal mode. In other words, the AP processing unit 50 receives data which are the demodulation result fed from the modem unit 28, as a receiving processing. The final destination of said data is not its own radio apparatus 10 but another radio apparatus 10 (not shown). While setting the not-shown another radio apparatus 10 as the final destination in the transmission processing, the AP processing unit 50 outputs the received data to the modem unit 28. The initial source of said data is not its own radio apparatus 10 but the not-shown another radio apparatus 10 which has transmitted the data received in the receiving processing.

The STA processing unit 52 carries out the processing for the aforementioned terminal mode. Known art used for a terminal apparatus may be employed as the processing for the terminal mode and therefore the description thereof is omitted here. However, as described above, the STA processing unit 52 is installed at least in an end position of the network and does not perform the relaying processing. In other words, the STA processing unit 52 receives data which are the demodulation result fed from the modem unit 28, as a receiving processing. The final destination of said data is its own radio apparatus 10. The STA processing unit 52 performs a predetermined processing on the received data and then outputs its result to the control unit 32. While setting another radio apparatus 10 (not-shown) as the final destination in the transmission processing, the STA processing unit 52 outputs the data received from the control unit 32 to the modem unit 28. The initial source of said data is its own radio apparatus 10.

The control unit 32 controls the operations related to the base station mode and the terminal mode in the data processing unit 30. That is, the control unit 32 selects either the operation of the AP processing unit 50 or the operation of the STA processing unit 52. The control unit 32 defines an infrastructure mode, an ad-hoc mode and a switching mode as the operation modes, and selects one of the three operation modes. As described already, the ad-hoc mode is an operation mode in which the AP processing unit 50 or the STA processing unit 52 is used constantly, whereas the switching mode is an operation mode in which the AP processing unit 50 and the STA processing unit 52 are used by switching back and forth between them. Note that when the ad-hoc mode is used, the STA processing units 52 only are used.

The operation unit 34, which is provided with buttons and the like, receives instructions from the user. If the radio apparatus 10 is so configured as to be connected to a personal computer, the operation unit 34 may be a keyboard or a mouse provided in the personal computer. The IF unit 36 is an interface with not-shown devices or their components. For example, if the radio apparatus 10 is connected to a personal computer and a printer, the IF unit 36 will be an interface with the personal computer and the printer. If, on the other hand, the radio apparatus 10 is built inside a handheld terminal device or the like, the IF unit 36 will be an interface with a display unit, a speaker, a CPU which are components of the handheld terminal device.

The user enters his/her instruction on the selection of the operation modes by the use of the operation unit 34. That is, the instruction on the selection for the infrastructure mode, the ad-hoc mode and the switching mode is inputted. If the infrastructure mode is inputted, the instruction on the selection of the base station mode or the terminal mode is inputted as well. If the instruction entered by the operation unit 34 is either an instruction to select the infrastructure mode or an instruction to select the ad-hoc mode, the fixed-mode receive unit 42 will receive either one of the instructions. If the fixed-mode receive unit 42 has received the instruction to select the infrastructure mode, the fixed-mode receive unit 42 will also receive the instruction on the selection of the base station mode or the terminal mode.

If the instruction entered by the operation unit 34 is the instruction to select the switching mode, the switching-mode receive unit 44 will receive this instruction. At the time the radio apparatus 10 is activated, the control unit 32 selects one of the infrastructure mode, the ad-hoc mode and the switching mode, as the operation mode of the data processing unit 30, and sets the thus selected operation mode. Then, the control unit 32 activates either one of the AP processing unit 50 and the STA processing unit 52 according to the operation mode set. More specifically, when the fixed-mode receive unit 42 receives the instruction to select the infrastructure mode and the instruction to select the base station mode, the control unit 32 will activate the AP processing unit 50.

On the other hand, when the fixed-mode receive unit 42 receives the instruction to select the infrastructure mode and the instruction to select the terminal mode or when the fixed-mode receive unit 42 receives the instruction to select the ad-hoc mode, the control unit 32 activates the STA processing unit 52. When the switching-mode receive unit 44 receives the instruction to select the switching mode, the control unit 32 activates the STA processing unit 52. That is, when the mode is set to the switching mode, the STA processing unit 52 activates the radio apparatus 10 by selecting the STA processing unit 52. When the radio apparatus 10 operates in the infrastructure mode or the ad-hoc mode, the base station mode or the terminal mode is specified by a user's instruction in the control unit 32. On the other hand, when the radio apparatus 10 operates in the switching mode, the base station mode or the terminal mode is not specified by the user's instruction in the control unit 32 but the terminal mode is automatically selected as the initial value.

The storage 38 stores various types of data and settings. For example, the storage 38 stores the settings received by the fixed-mode receive unit 42 and the switching mode receive unit 44. The battery 24 is a power supply that drives the radio apparatus 10. The radio apparatus 10 may be driven by an AC adaptor instead of the battery 24.

In what is to follow, a description is given of a processing carried out when a radio apparatus 10 is started. In such a case, the STA processing unit 52 is started, as described above. The detector 40 detects a packet signal, received via the radio unit 26, the modem unit 28 and the STA processing unit 52 from not-shown other radio apparatuses 10, before a certain period of time has elapsed after the power-on. Here, the packet signal received from not-shown other radio apparatuses is a packet signal containing a broadcast signal, namely a beacon signal. When such a beacon signal is received, this means that there is at least another radio apparatus 10 in the base station mode or a base station apparatus located near said radio apparatus 10. If no beacon signal is detected during the certain period of time, the detector 40 will inform the switching-mode receive unit 44 accordingly. Further, the switching-mode receive unit 44 informs the switching unit 46 accordingly. Upon receipt of the notification, the switching unit 46 stops the operation of the STA processing unit 52 and starts the operation of the AP processing unit 50. In other words, the switching unit 46 switches the operation of the data processing unit 30 from the terminal mode to the base station mode.

If the detector 40 detects the beacon signal during the certain period of time, the detector 40 will output the content of the beacon signal and convey the fact that the beacon signal has been detected, to the switching-mode receive unit 44. Note here that the beacon signal contains information on an apparatus that has transmitted the beacon signal. One of such items of information is information on whether the source of the beacon signal belongs to another radio apparatus 10 compatible with the base station mode and terminal mode or a normal base station. Upon receipt of the fact that the beacon signal has been detected, the switching-mode receive unit 44 checks the type of a source apparatus, based on the content of the beacon signal. If the source apparatus is another radio apparatus compatible with the base station mode and the terminal mode, the switching-mode receive unit 44 will output the received information to the maintenance unit 48. If, on the other hand, the source apparatus is a normal base station apparatus, the switching-mode receive unit 44 will output the received information to the switching unit 46.

Upon receipt of the information from the switching-mode receive unit 44, the maintenance unit 48 maintains the operation of the STA processing unit 52. In other words, the maintenance unit 48 maintains the setting of the terminal mode. Upon receipt of the information from the switching-mode receive unit 44, the switching unit 46 stops the operation of the STA processing unit 52 and starts the operation of the AP processing unit 50.

This structure may be implemented hardwarewise by elements such as a CPU, memory and other LSIs of an arbitrary computer, and softwarewise by memory-loaded programs having communication functions or the like. Depicted herein are functional blocks implemented by cooperation of hardware and software. Therefore, it will be obvious to those skilled in the art that the functional blocks may be implemented by a variety of manners including hardware only, software only or a combination of both.

Figure 4:
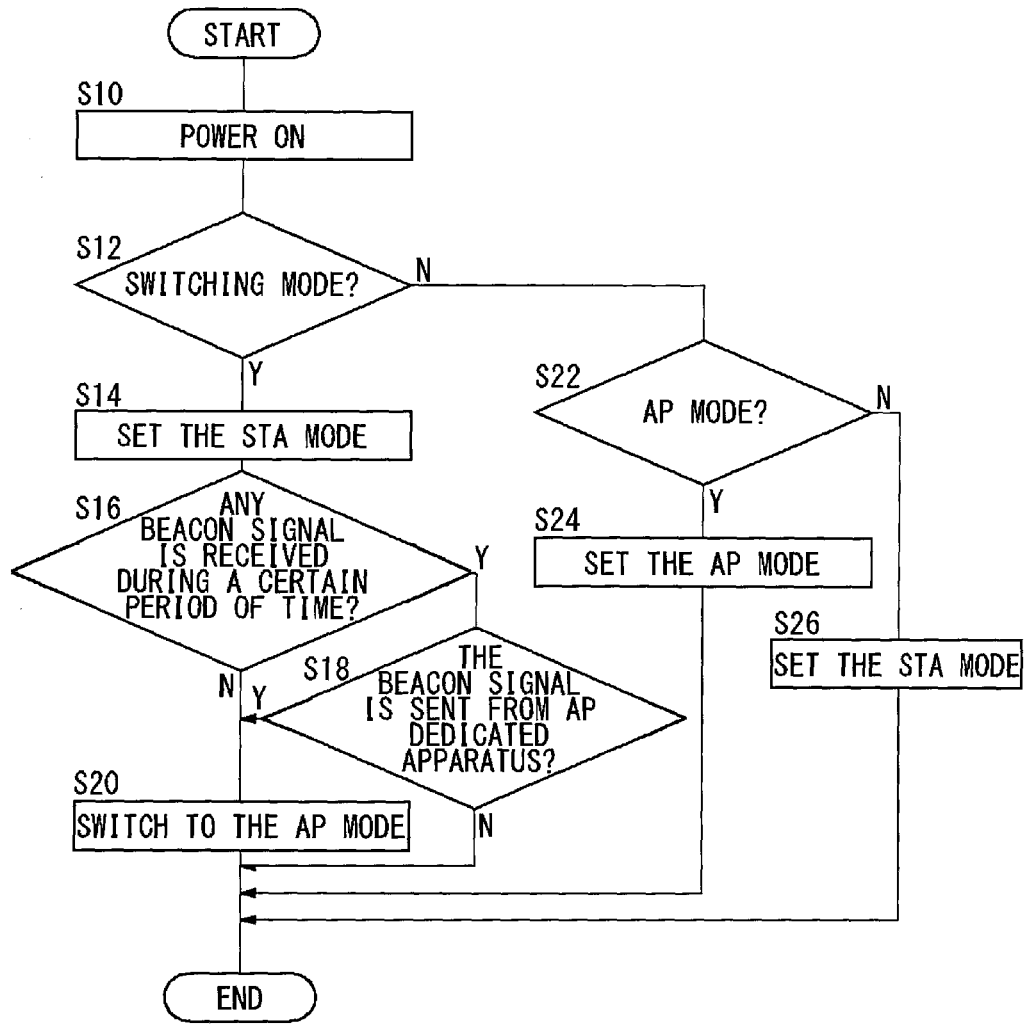
FIG. 4 is a flowchart showing a setting procedure performed by the radio apparatus of FIG. 3.

An operation of the communication system 100 structured as above is now described. FIG. 4 is a flowchart showing a setting procedure performed by a radio apparatus 10. Power is ON (S10). If the switching-mode receive unit 44 has received an instruction to start in the switching mode (Y of S12), the control unit 32 will start the operation of the STA processing unit 52. In other words, the control unit 32 sets the terminal mode (S14). Hereinafter, the terminal mode will be referred to as "STA mode" also, and no distinction will be made between the terms "terminal mode" and "STA mode". If the detector 40 does not receive any beacon signal during a certain period of time (N of S16), the switching unit 46 will stop the operation of the STA processing unit 52 and start the operation of the AP processing unit 50. In other words, the switching unit 46 switches the mode to the base station mode (S20). Hereinafter, the base station mode will be referred to as "AP mode" also, and no distinction will be made between the terms "base station mode" and "AP mode".

If, on the other hand, the detector 40 receives the beacon signal during the certain period of time (Y of S16) and the source of the beacon signal is a normal base station apparatus (Y of S18), the switching unit 46 will switch the mode to the AP mode (S20). Hereinafter, the normal base station apparatus will be referred to as an "AP dedicated apparatus" also, and no distinction will be made between the terms "normal base station apparatus" and "AP dedicated apparatus". If the source of the beacon signal is not the AP dedicated apparatus (N of S18), the processing will be terminated. If the switching-mode receive unit 44 does not receive an instruction to start in the switching mode (N of S12), namely if the fixed-mode receive unit 42 receives an instruction to start in the infrastructure mode or the ad-hoc mode, the fixed-mode receive unit 42 will check if it is the AP mode or the STA mode. If it is the AP mode (Y of S22), the control unit 32 will start the operation of the AP processing unit 50. That is, the control unit 32 sets the AP mode (S24). If, it is not the AP mode (N of S22), the control unit 32 will set the STA mode (S26).

By employing the present exemplary embodiment, the operation mode is selected based on a user's instruction at power-on, so that the user's intention can be reflected. Also, when the operation is started in the switching mode, the terminal mode is selected. Thus the situation where there may be a plurality of radio apparatuses operating in the base station mode can be avoided and therefore the stability of communications can be maintained. Also, if no beacon signal is received, the mode will be switched from the terminal mode to the base station mode, so that the communication in switching mode can be executed. Also, if the received beacon signal is transmitted from an AP dedicated apparatus, the mode will be switched from the terminal mode to the base station mode, so that the communication in the switching mode can be executed separately from the communication in the infrastructure mode.

3. The Setting of Mode when Connected

An outline is first described. WPS (Wi-Fi Protected Setup) is being developed as a method for achieving a simple and easy connection of radio apparatuses in a wireless LAN. As a precondition for WPS, there is demand that the security protection on the wireless LAN access be enforced as the wireless LAN becomes widespread in recent years. Accordingly, instead of WEP (Wired Equivalent Privacy), WPA (Wi-Fi Protected Access) is developed and therefore the security protection on the wireless LAN access is enforced. In WEP, the length of encryption key or initial vector (IV) is short and therefore the message integrity cannot be guaranteed. On the other hand, the WPA employs a temporal key integrity protocol (TKIP), which extends the length of encryption key and can update the encryption key periodically, and a message integrity code (MIC) that detects the message falsification.

WPA supports pre-shared keys (PSK) to achieve mutual authentication. To form a wireless LAN network protected by PSK, the user needs to set PSK beforehand in both a base station apparatus and terminal apparatuses connecting to this base station apparatus. In addition to the setting of PSK, the user must set a service set identifier (SSID), by which to identify a wireless LAN network, and also perform many other settings to protect the security of the wireless LAN network.

WPS has been developed in order to alleviate such a burden imposed on users. In a radio apparatus 10 compatible with WPS, a personal identification number (PIN) is entered; alternatively, SSID, WPA and the like are set using a push-button configuration (PBC). Use of such a radio apparatus 10 compatible with WPS allows the user to easily build up a secure wireless LAN network.

If, in such a case, two radio apparatuses 10 are connected using the aforementioned WPS, the modes therefor must also be set. When the two radio apparatuses 10 have already been activated, the base station mode or the terminal mode has already been set in each of them. Since the setting of the modes may reflect the relation with the other radio apparatus 10, the same condition is preferably kept even after the establishment of connection therebetween. In order to cope with this, when a simple connection is to be made, the radio apparatus 10 according to the present exemplary embodiment sets the base station mode or the terminal mode so that the mode can be maintained before and after the connection has been established.

The structure of the radio apparatus 10 is of the same type as that shown in FIG. 3. A description is given here centering around the differences. A simple connection is established by WPS between a radio apparatus 10 and another radio apparatus 10 when said radio apparatus 10 and the another radio apparatus 10 are located within a distance range, where the their mutual packet signals can be received, and when the buttons of both the radio apparatus 10 and the another radio apparatus 10 are pressed down. In other words, when the simple connection is to be established, the user depresses the button of the operation unit 34 in said radio apparatus 10. When the control unit 32 detects that the button has been depressed, the simple connection is established by WPS between the radio apparatus 10 and the not-shown another radio apparatuses 10, via the radio unit 26, the modem unit 28 and the data processing unit 30. It is to be noted that known art may be employed for the simple connection by WPS and therefore the description thereof is omitted here.

As described earlier, the AP processing unit 50 or the STA processing unit 52 is activated in the data processing unit 30, and the storage 38 stores the information on whether the AP processing unit 50 or the STA processing unit 52 has been activated. This information thereon will be referred to as "mode information". The control unit 32 exchanges the mode information with the another radio apparatus 10 before the simple connection is established. There are two methods of mode exchange. One is a method where the control unit 32 transmits the mode information to the another radio apparatus 10 via the data processing unit 30, the modem unit 28 and the radio unit 26 and has the another radio apparatus 10 determine the mode.

The other one is a method where the control unit 32 receives the mode information sent from the another radio apparatus 10, via the radio unit 26, the modem unit 28 and the data processing unit 30 so as to determine the mode. In other words, either one of the radio apparatus 10 and the another radio apparatus 10 keeps track of the mode information on both of them and determines the modes for both of them. The thus determined modes are also conveyed to the radio apparatus 10 which is the communicating party. In other words, the control unit 32 starts the operation of the AP processing unit 50 or the STA processing unit 52 via the radio unit 26, the modem unit 28 and the data processing unit 30, based on a result of the mode information exchanged with the another radio apparatus 10.

For example, the rules to determine the mode are set herein as follows.

(1) Where both terminal apparatuses operate under the base station mode, the present mode is maintained. That is, an inter-base station communication is achieved between the both. Hereinafter, the inter-base station communication will be referred to as "inter-AP communication" also, and no distinction will be made between the terms "inter-base station communication" and "inter-AP communication". Since known art may be employed as the inter-base station communication, the description thereof is omitted here.

(2) Where one terminal apparatus already operates in the base station mode or has determined to operate in the base station mode, this terminal apparatus is set to the base station mode and the other is set to the terminal mode.

(3) Where both terminal apparatuses operate in the terminal mode and the both determine not to change the mode to the base station mode, the setting of the terminal mode is maintained. That is, the ad-hoc mode is achieved in the both. The case of "determining not to change the mode to the base station mode" corresponds to a case when the user does not desire the apparatus to operate in the base station mode and/or a case when the remaining amount of battery is low and/or the case when the receiving level drops and one or both of the terminal apparatuses moves to a different area.

Figure 5:
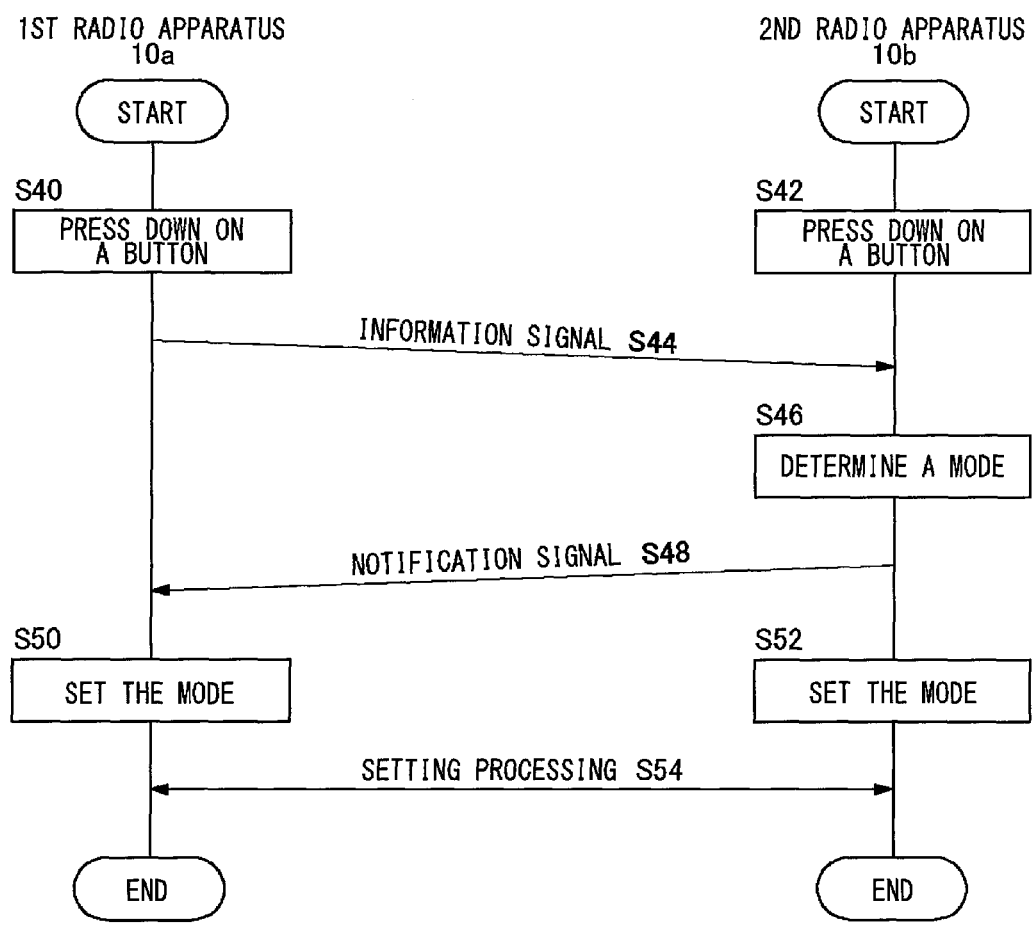
FIG. 5 is a sequence diagram showing a setting procedure in a communication system according to an exemplary embodiment of the present invention.

An operation of the communication system 100 configured as above will now be described. FIG. 5 is a sequence diagram showing a setting procedure in the communication system 100 according to an exemplary embodiment of the present invention. The button of the first radio apparatus 10a is pressed down (S40), and the button of the second radio apparatus 10b is pressed down as well (S42). The first radio apparatus 10a transmits the mode information to the second radio apparatus 10b as an information signal (S44). The second radio apparatus 10b determines a mode (S46). The second radio apparatus 10b transmits the thus determined mode to the first radio apparatus 10a as a notification signal (S48). The first radio apparatus 10a sets the mode (S50), and the second radio apparatus 10b sets the mode as well (S52). Both the first radio apparatus 10a and the second radio apparatus 10b perform the setting processing required by WPS (S54).

Figure 6:
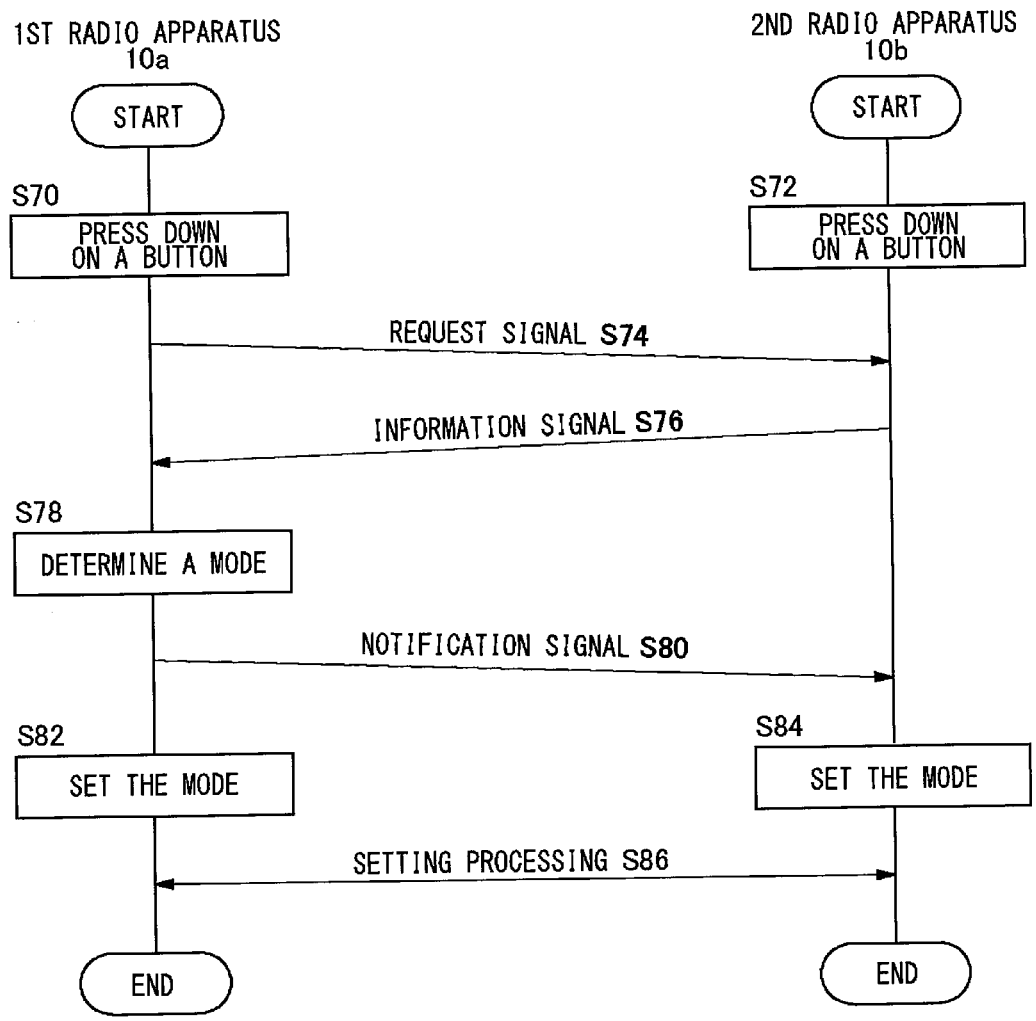
FIG. 6 is a sequence diagram showing another setting procedure in a communication system according to an exemplary embodiment of the present invention.

FIG. 6 is a sequence diagram showing another setting procedure in the communication system 100 according to the exemplary embodiment of the present invention. The button of the first radio apparatus 10a is pressed down (S70), and the button of the second radio apparatus 10b is pressed down as well (S72). The first radio apparatus 10a transmits a request signal for the transmission of mode information, to the second radio apparatus 10b (S74). The second radio apparatus 10b transmits the mode information to the first radio apparatus 10a as an information signal (S76). The first radio apparatus 10a determines a mode (S78). The first radio apparatus 10a transmits the determined mode to the second radio apparatus 10b as a notification signal (S80). The first radio apparatus 10a sets the mode (S82), and the second radio apparatus 10b sets the mode as well (S84). Both the first radio apparatus 10a and the second radio apparatus 10b perform the setting processing required by WPS (S86).

Figure 7:
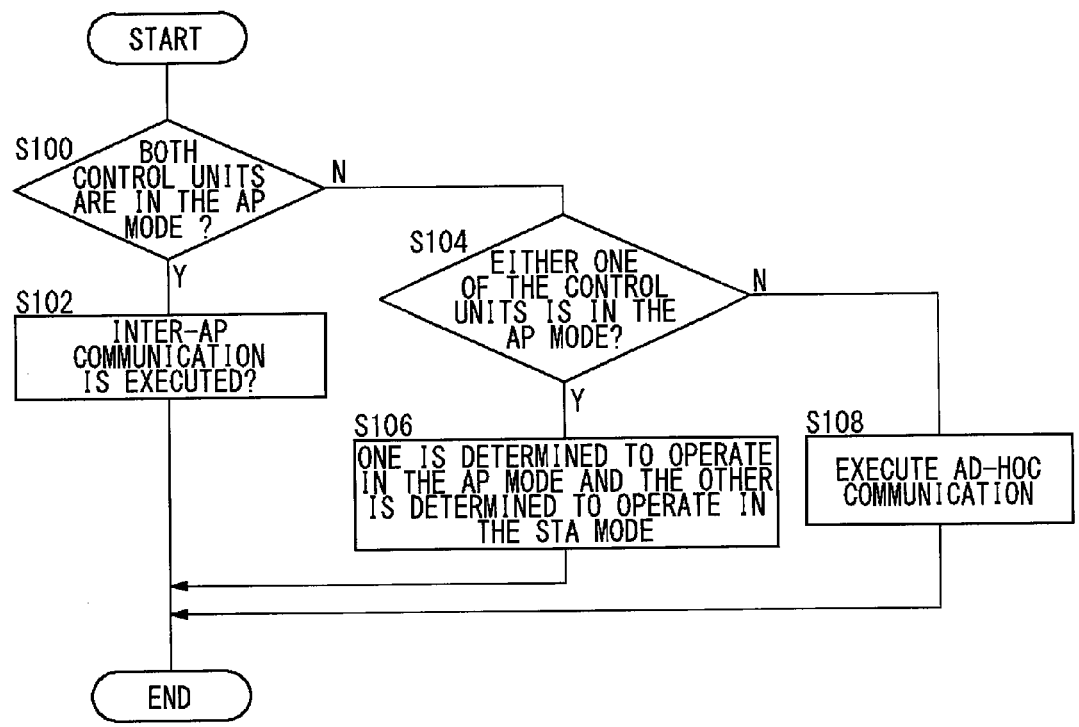
FIG. 7 is a flowchart showing a decision procedure in FIG. 5 or FIG. 6.

FIG. 7 is a flowchart showing a decision procedure in FIG. 5 or FIG. 6. If both the control unit 32 of the radio apparatus 10 and the control unit 32 of another radio apparatus 10 are in the AP mode (Y of S100), the inter-AP communication will be carried out (S102). If not both of them are in the AP mode (N of S100) and either one of them is in the AP mode (Y of S104), the one of them will be determined to be operated in the AP mode and the other in the STA mode (S106). If neither of them is in the AP mode (N of S104), the execution of the ad-hoc communication will be determined (S108).

By employing the present exemplary embodiment, the mode is adjusted when the simple connection is to be established. Thus the processing can transit smoothly to a communication state after the connection. Also, the mode that has been used so far is used as many times as possible, so that the adverse effect on the other radio apparatuses can be reduced.

4. Switching from AP Mode to STA Mode

An outline is first described. There are cases where a radio apparatus 10 operating in the base station mode requests the switching of the mode from the base station mode to the terminal mode. For example, it is a case when the remaining amount of battery is low. The stable communication is still required even when the radio apparatus 10 has switched the mode from the base station mode to the terminal mode. To cope with this situation, the radio apparatus 10 according to an exemplary of the present invention acquires the status of other radio apparatuses 10 in the periphery thereof and selects any one of the other radio apparatuses 10. Also, the radio apparatus 10 requests the thus selected another radio apparatus 10 to switch the mode to the base station mode.

Figure 8:
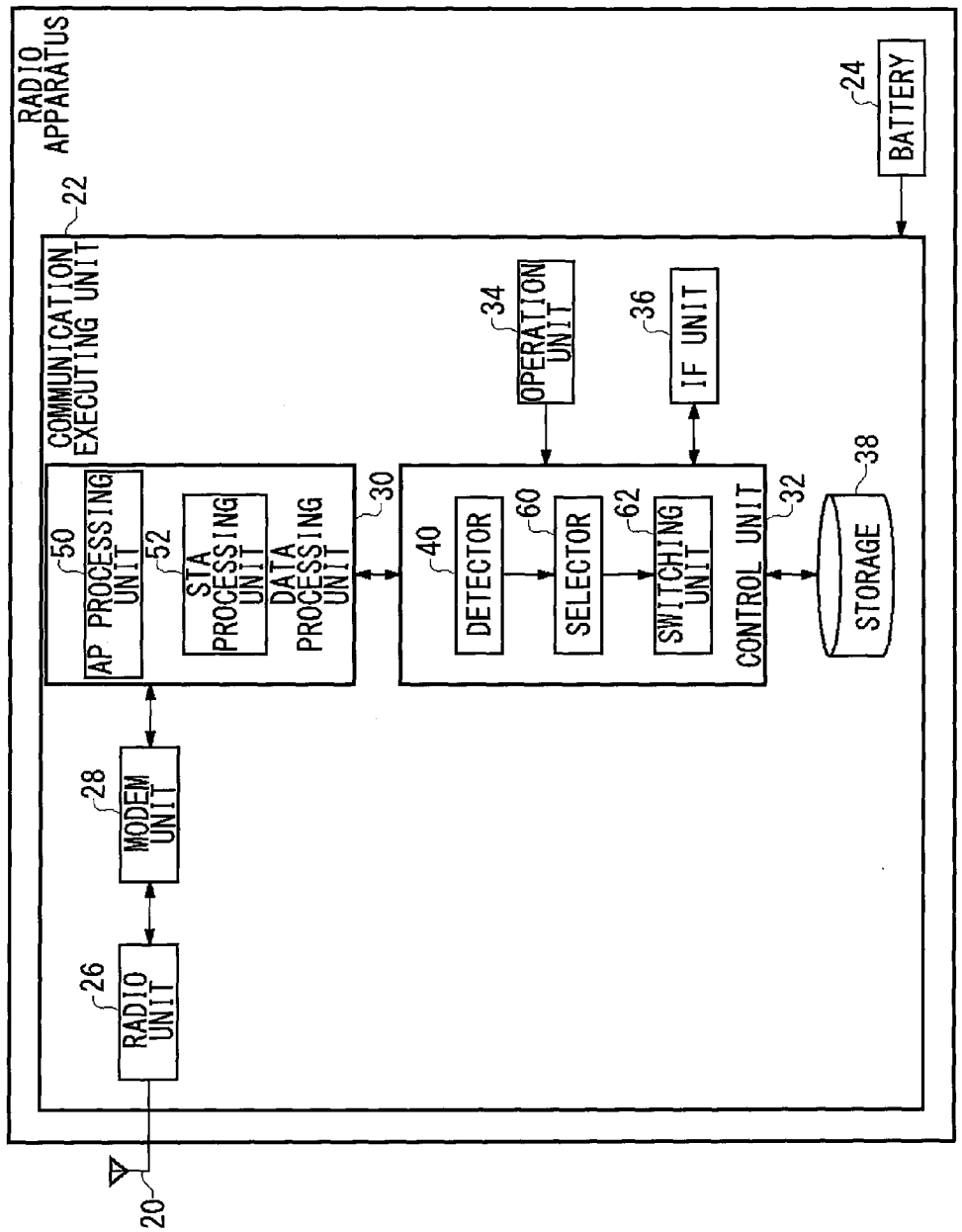
FIG. 8 illustrates another structure of a radio apparatus according to an exemplary embodiment of the present invention.

FIG. 8 illustrates another structure of the radio apparatus 10 according to the exemplary embodiment of the present invention. The structure of the radio apparatus 10 is of the same type as that shown in FIG. 3. A description is given here centering around the differences. The control unit 32 includes a detector 40, a selector 60, and a switching unit 62. The detector 40 monitors the remaining amount of a battery 24 included in the radio apparatus 10. If the detector 40 detects that the remaining amount of the battery 24 has dropped below a threshold value while the AP processing unit 50 is operating, namely while the base station mode is set, the detector 40 will report this situation to the selector 60.

Upon receipt of the notification reported from the detector 40, the selector 60 broadcasts the fact that the remaining amount of battery has dropped, to the other radio apparatuses 10 as the resource information via the AP processing unit 50, the modem unit 28 and the radio unit 26. After the notification, the selector 60 acquires the resource information sent from the other radio apparatuses 10, via the radio unit 26, the modem unit 28 and the data processing unit 30. The resource information contains the information on the remaining amounts of battery in the other radio apparatuses 10, for instance. The selector 60 selects another radio apparatus 10 whose remaining amount of battery is greater than the threshold value. If there are a plurality of other radio apparatuses 10 whose remaining amounts of battery are greater than the threshold value, the selector 60 will select a radio apparatus 10 whose remaining amount of battery is the largest thereamong. The selector 60 instructs the thus selected another radio apparatus 10 to change the mode from the terminal mode to the base station mode, via the AP processing unit 50, the modem unit 28 and the radio unit 26. After the instruction from the selector 60 has been outputted, the switching unit 62 stops the operation of the AP processing unit 50 and starts the operation of the STA processing unit 52. In other words, the switching unit 62 switches the operation of the data processing unit 30 from the base station mode to the terminal mode.

Figure 9:
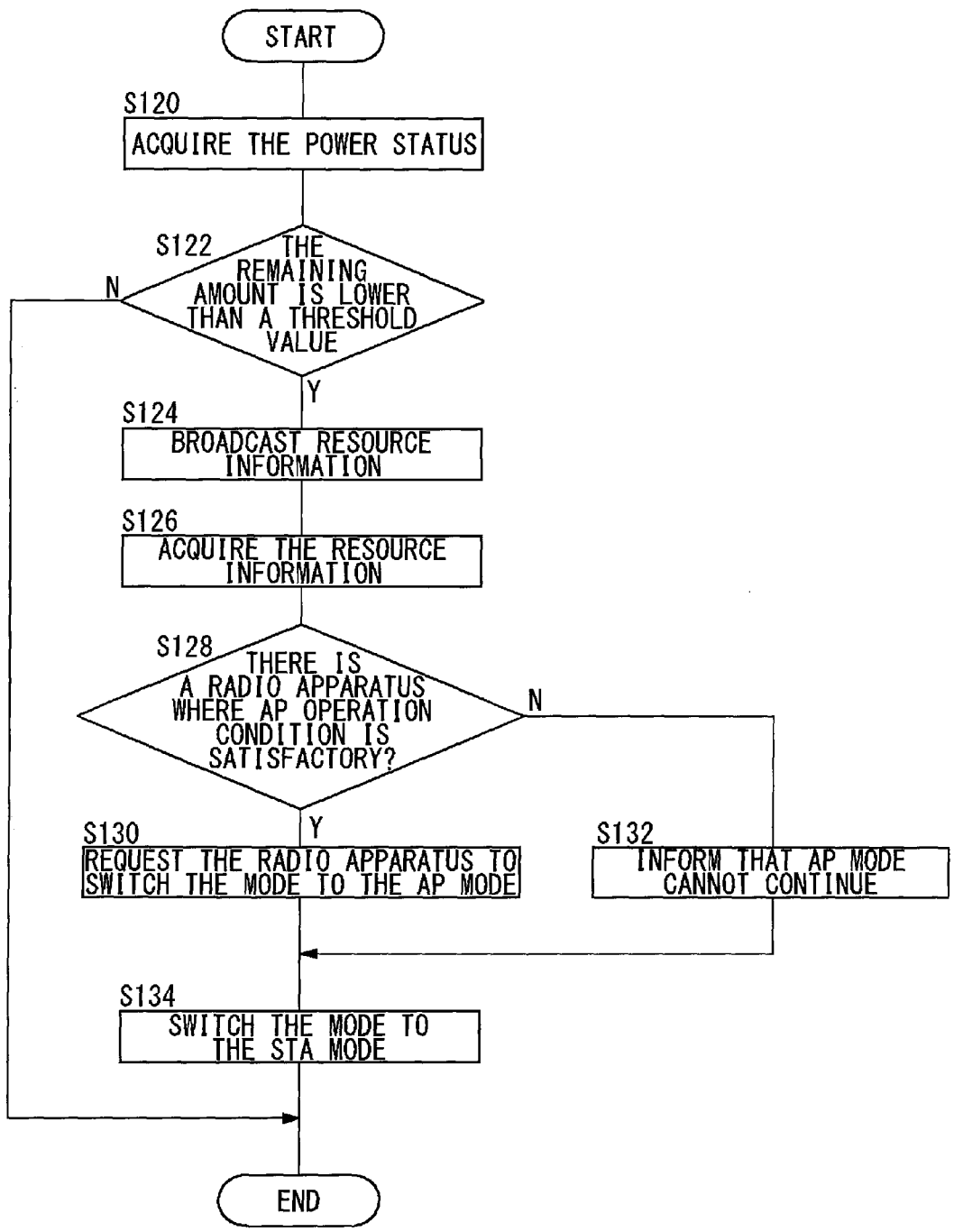
FIG. 9 is a flowchart showing a setting procedure performed by the radio apparatus of FIG. 8.

An operation of the communication system 100 configured as above will now be described. FIG. 9 is a flowchart showing a setting procedure performed by the radio apparatus 10. The detector 40 acquires the power status of the battery 24 (S120). If the remaining amount of the battery 24 is lower than the threshold value (Y of S122), the selector 60 will broadcast the resource information (S124) and acquire the resource information (S126). If there is any radio apparatus where an AP operation condition is satisfactory (Y of S128), the selector 60 will request said radio apparatus 10 to switch the mode to the AP mode (S130). If, on the other hand, there is no radio apparatus where the AP operation condition is satisfactory (N of S128), the selector 60 will inform the situation where the AP mode cannot continue (S132). Then, the switching unit 62 switches the mode to the STA mode (S134). If the remaining amount of the battery 24 is not lower than the threshold value (N of S122), the processing will be terminated.

By employing the present exemplary embodiment, when the remaining amount of battery gets low, the mode is switched from the base station mode to the terminal mode, so that the battery consumption can be reduced. Also, the instruction of the switching of the mode to the base station mode is given to the another radio apparatus before the switching, so that the situation can be avoided where there is no radio apparatus that operates in the base station mode in the network. Since the situation where there is no radio apparatus that operates in the base station mode in the network is avoided, the stable communication can be maintained. Also, since the situation where there is no radio apparatus that operates in the base station mode in the network is avoided, the communication in the switching mode can be maintained.

5. Integration and Division of BSS

An outline is first described. When two BSSs are approaching, there are cases where these two BSSs are required to operate as a single BSS. For example, it is when two radio apparatuses 10 each of which belongs to a different BSS are to be communicated with each other. If there are two BSSs, there will be two radio apparatuses 10 both set in the base station mode. To integrate the two BSSs into a single BSS, an adjustment must be made between these two radio apparatuses 10. On the other hand, there are cases, to the contrary to the above, where a single BSS is required to be divided into two BSSs. For example, it is when the number of radio apparatuses 10 within a given BSS increases and/or the traffic within the BSS gets heavy. If there is a single BSS, there will be a single radio apparatus set in the base station mode. Dividing a single BSS into two BSSs requires another radio apparatus 10 set in the base station mode.

To cope with this, a radio apparatus 10 according to the present exemplary embodiment carries out the following processing. One of the two radio apparatuses 10 recognizes the proximity of the other thereof when the received power of beacon signal sent from the other radio apparatus has become larger than a threshold value. Then, the radio apparatus 10 broadcasts the information on the other radio apparatus 10, to the other radio apparatus 10 and then switches the mode from the base station mode to the terminal mode. As a result, the other radio apparatus 10 operates only in the base station mode and therefore the two BSSs are integrated into one.

In a given BSS, the radio apparatus 10 set in the base station mode detects that the traffic intensity has become larger than a threshold level. Then the radio apparatus 10 selects one of radio apparatuses 10 set in the terminal mode. Also, the radio apparatus 10 instructs the thus selected radio apparatus 10 to switch the mode from the terminal apparatus to the base station mode, thereby forming a new BSS. Further, the radio apparatus 10 also specifies a radio apparatus 10 which is to be included in the new BSS.

Figure 10A:
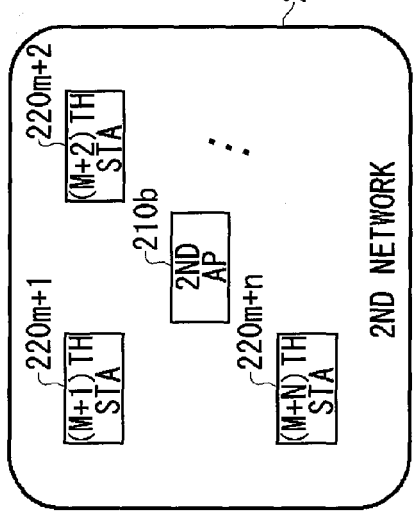
FIGS. 10A and 10B each illustrates still another configuration of a communication system according to an exemplary embodiment of the present invention.
Figure 10B:
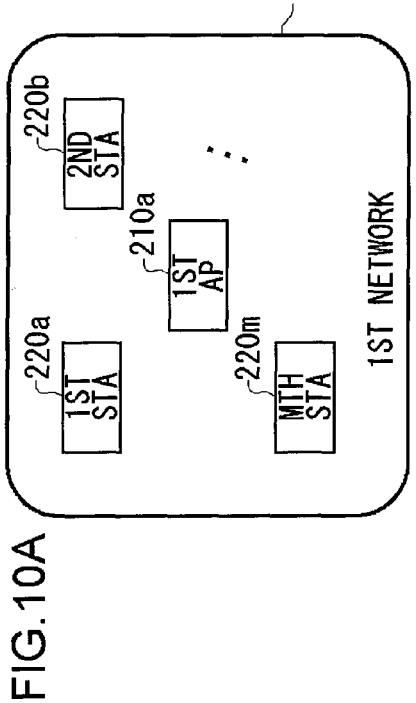

FIGS. 10A and 10B each illustrates still another configuration of a communication system according to the exemplary embodiment of the present invention. As illustrated in FIG. 10A, a communication system 100 includes a first network 200 and a second network 202. The first network 200 includes a first AP 210a, which is generically referred to as "AP 210" also, and a first STA 220a, a second STA 220b, . . . , and Mth STA 220m, which are generically referred to as "STA 220" or "STAB 220". The second network 202 includes a second AP 210b, which is generically referred to as "AP 210" also, and an (M+1)th STA 220m+1, an (M+2)th STA 220m+2, . . . , an (M+N)th STA 220m+n, which are referred to as "STA 220" or "STAs 220". The first network 200 and the second network 202 corresponds to BSSs.

As illustrated in FIG. 10B, the communication system 100 includes a network 204. The network 204 includes a first AP 210a, which is generically referred to as "AP 210" also, and a first STA 220a, a second STA 220b, . . . , an Mth STA 220m, an (M+1)th STA 220m+1, an (M+2)th STA 220m+2, . . . , an (M+N)th STA 220m+n, and an (M+N+1)th STA 220m+n+1, which are referred to as "STA 220" or "STAs 220". Here, the AP 210 corresponds to a radio apparatus 10 set in the base station mode, whereas the STAs 220 correspond to radio apparatuses 10 set in the terminal mode. In this case, too, the network 204 corresponds to a BSS.

A description is first given hereunder of an integration processing of BSS, followed by a division processing thereof. For the integration processing of BSS, FIG. 10A corresponds to a state before the integration, whereas FIG. 10B corresponds a state after the integration. Referring to FIG. 10A, the first network 200 includes a single AP 210 and a plurality of STAs 220, and the AP 210 and the STAs 220 communicate in an exchange mode. The second network also includes a single AP 210 and a plurality of STAs 220, and the AP 210 and the STAs 220 communicate in the exchange mode. Under these conditions, the second AP 210b switches the mode from the base station mode to the terminal mode when the second AP 210b has detected that the first AP 210a is approaching. As a result, the second AP 210b becomes the (M+N+1)th STA 220m+n+1, as illustrated in FIG. 10B. In consequence, the second network 202 is integrated into the first network 200 so as to become the network 204.

A description is now given of the division processing. In the division processing, FIG. 10B corresponds to a state before the division, whereas FIG. 10A corresponds to a state after the division. Referring to FIG. 10B, the network 204 includes the single AP 210 and the plurality of STAs 220, and the AP 210 and the STAs 220 communicate in the exchange mode. The first AP 210 selects one of the plurality of STAs 220 when the size of the network 204 has become larger than a threshold value. Assume herein that the (M+N+1)th STA 220m+n+1 is selected. The first AP 210 instructs the (M+N+1)th STA 220m+n+1 to switch the mode from the terminal mode to the base station mode. As a result, the (M+N+1)th STA 220m+n+1 becomes the second AP 210b, as illustrated in FIG. 10A. Also, the first AP 210 instructs a part of the plurality of STAs 220 and the second AP 210b to form another network. Finally, the first network 200 and the second network 202 are formed.

Figure 11:
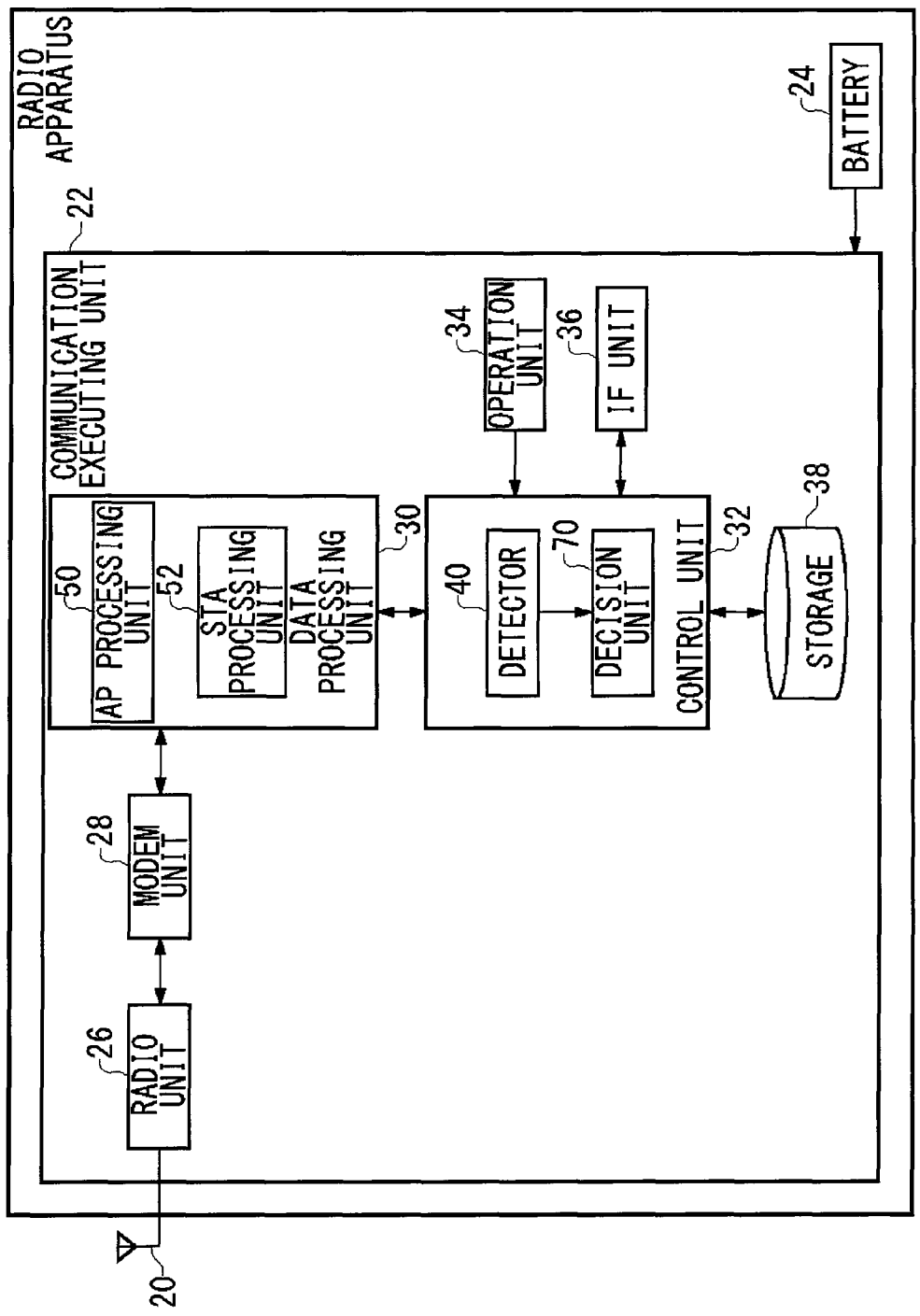
FIG. 11 illustrates another structure of a radio apparatus according to an exemplary embodiment of the present invention.

FIG. 11 illustrates another structure of a radio apparatus 10 according to the exemplary embodiment of the present invention. The structure of the radio apparatus 10 as shown in FIG. 11 is of the same type as that shown in FIG. 3 or FIG. 8. A description is given hereunder centering around the differences. The control unit 32 includes a detector 40 and a decision unit 70. A description is first given of an integration processing. The detector 40 detects the power of beacon signal received from another radio apparatus 10 via the radio unit 26, the modem unit and the AP processing unit 50. When the received power of beacon signal has become greater than a threshold value, the detector 40 informs the detector 40 accordingly. Upon receipt of the notification informed by the detector 40, the decision unit 70 determines the switching of mode from the base station mode to the terminal mode. Also, the decision unit conveys the information on the another radio apparatus 10 to other radio apparatuses located within the same BSS, via the AP processing unit, the modem unit 28 and the radio unit 26. Then, the decision unit 70 stops the operation of the AP processing unit 50 and starts the operation of the STA processing unit 52.

A description is now given of the division processing. The detector 40 monitors the size of the network 204. The size of the network 204 is identified by the traffic intensity in the network 204 and the number of radio apparatuses 14 included in the network 204. If the detector 40 detects that the traffic intensity and/or the number of radio apparatuses 10 have/has become larger than a threshold level/value, the detector 40 will report this situation to the decision unit 70. Upon receipt of the notification reported from the detector 40, the decision unit 70 gathers the mode information and selects another radio apparatus 10, as described earlier. The decision unit 70 instructs the selected another radio apparatus 10 to switch the mode to the base station mode, via the AP processing unit 50, the modem unit 28 and the radio unit 26. Also, the decision unit 70 identifies at least a single other radio apparatus 10 that has transmitted a packet signal whose received power is close to that of a packet signal transmitted from the selected radio apparatus 10. Further, the decision unit 70 instructs the identified another radio apparatus 10 to move to the new BSS formed by the radio apparatus 10 that newly operates in the base station mode.

Figure 12:
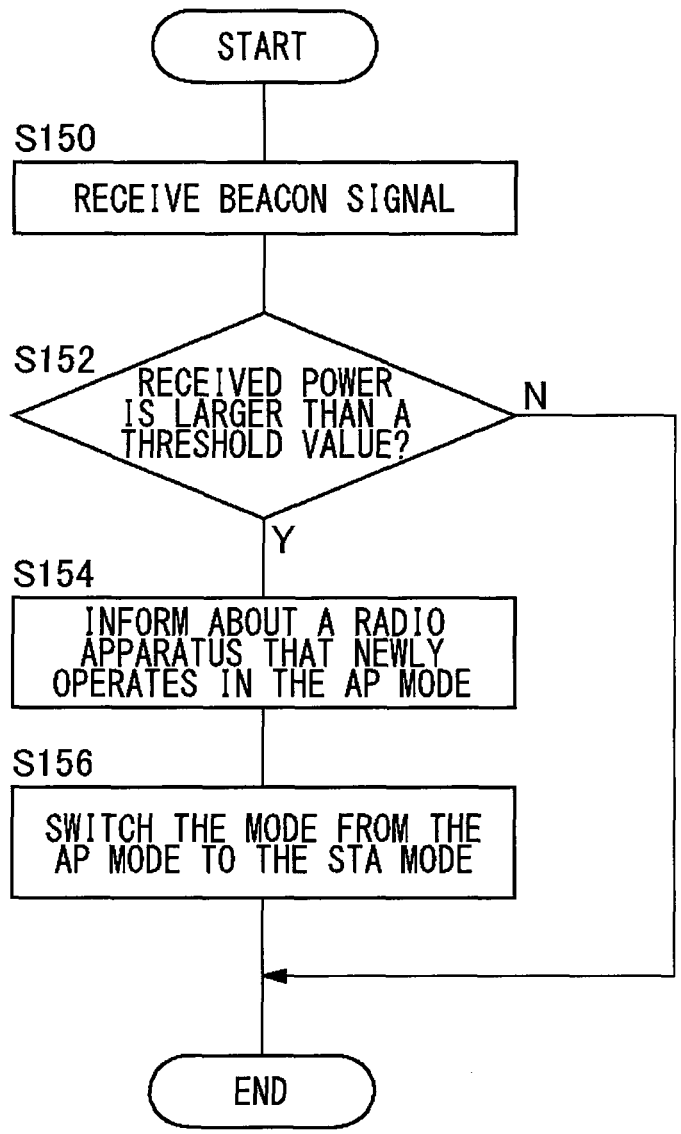
FIG. 12 is a flowchart showing a setting procedure performed by the radio apparatus of FIG. 11.

An operation of the communication system 100 configured as above will now be described. FIG. 12 is a flowchart showing a setting procedure performed by the radio apparatus 10.

The radio unit 26, the modem unit 28 and the AP processing unit 50 receive a beacon signal (S150). If the detector 40 detects that the received power has become larger than a threshold value (Y of S152), the selector 60 will inform other radio apparatuses 10 belonging to the same BSS, about a radio apparatus 10 that newly operates in the AP mode (S154). The decision unit 70 switches the mode from the AP mode to the STA mode (S156). If, on the other hand, the detector 40 does not detect that the received power has become larger than the threshold value (N of S152), the processing will be terminated.

Figure 13:
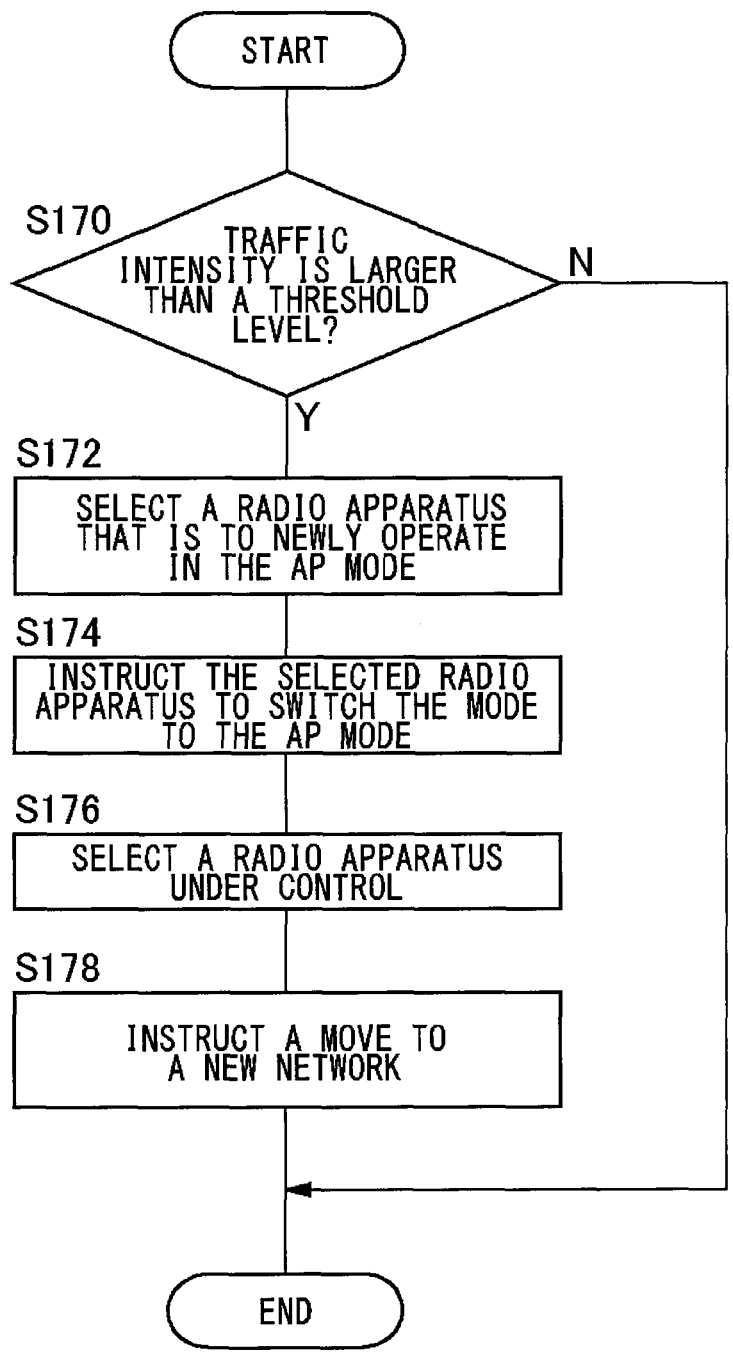
FIG. 13 is a flowchart showing another setting procedure performed by the radio apparatus of FIG. 11.

FIG. 13 is a flowchart showing another setting procedure performed by the radio apparatus 10. If the detector 40 detects that the traffic intensity has become larger than a threshold level (Y of S170), the decision unit 70 will select a radio apparatus 10 that is to newly operate in the AP mode (S172). The decision unit 70 instructs the selected radio apparatus 10 to switch the mode to the AP mode, via the AP processing unit 50, the modem unit 28 and the radio unit 26 (S174). The decision unit 70 selects another radio apparatus 10 that operates under the control of the selected radio apparatus 10 (S176). The decision unit 70 instructs the selected another radio apparatus 10 to move to a new network, via the AP processing unit 50, the modem unit 28 and the radio unit 26 (S178). If the detector 40 does not detect that the traffic intensity has become larger than the threshold level (N of S170), the processing will be terminated.

By employing the present exemplary embodiment, when two BSSs are approaching, they are integrated into a single BSS, so that the number of radio apparatuses capable of wireless communications can be increased. Since the number of radio apparatuses capable of wireless communications is increased, the user's convenience is enhanced. Also, when the proximity of a radio apparatuses operating in the base station mode is sensed, the mode is switched from the base station to the terminal mode so as to achieve the integration of BSSs. Also, when the size of a network becomes larger, BSS is divided into two BSSs. Thus the degradation in throughput can be suppressed. Also, since a radio apparatus that is to newly operate in the base station mode is specified, the division of BSS can be achieved.

6. Withdrawal of a Radio Apparatus Operating in the AP Mode

An outline is first described. In the section 4, the radio apparatus 10 in the base station mode instructs another radio apparatus 10 to switch the mode to the base station mode before the radio apparatus 10 in the base station mode switches to the terminal mode. That is, the base station mode is handed over. However, there may be cases where the radio apparatus 10 in the base station mode switches to the terminal mode before such a handover is done or it withdraws from the communication system 100. Even in such a case, a stable communication must be maintained among the remaining radio apparatuses 10. To cope with this requirement, the radio apparatuses 10 according to the present exemplary embodiment carry out the following processing.

The radio apparatuses 10 included in the communication system are given their respective degrees of priority, and a radio apparatus 10 having a high priority switches the mode from the terminal mode to the base station mode. If there is no high-priority radio apparatuses 10 at all, the ad-hoc network is implemented in the communication system 100.

The structure of the radio apparatus 10 is of the same type as that shown in FIG. 3, FIG. 8 and FIG. 11. A description is given here centering around the differences. As described in conjunction with FIGS. 2A and 2B, one radio apparatus 10 in the communication system 100 operates in the base station mode, whereas the remaining radio apparatuses 10 operate in the terminal mode. Among a plurality of radio apparatuses included in the communication system 100, the degrees of priority for the radio apparatus 10 that is to next operate in the base station mode are determined. To determine the degrees of priority, the plurality of radio apparatuses 10 exchange the aforementioned mode information with one another. As a result, the control units 32 in the respective plurality of radio apparatuses 10 mutually keep tracks of the remaining amounts of the batteries 24 in the respective plurality of radio apparatuses. Here, each control unit 32 assigns the priority in such a manner that the larger the remaining amount thereof, the higher the degree of priority is. Thus, the degrees of priority grasped by each radio apparatus 10 are consistent among the plurality of radio apparatuses 10.

Under these conditions, it is assumed that a radio apparatus 10 operating in the base station mode withdraws from the communication system 100. As a result, there are only a plurality of radio apparatuses 10 operating in the terminal mode within the communication system 100. A control unit 32 included in one of the plurality of radio apparatuses 10 recognizes the withdrawal of the radio apparatus operating in the base station mode. For example, the control unit 32 recognizes the withdrawal thereof when the communication between any radio apparatus 10 operating in the terminal mode and the radio apparatus 10 operating in the base station mode is no longer possible or when the beacon signal is no longer received from the radio apparatus 10 operating in the base station mode. The control unit 32 inquires of other radio apparatuses 10 as to whether they can communicate with the radio apparatus 10 operating in the base station mode or not, via the STA processing unit 52, the modem unit 28 and the radio unit 26. If no response is received from them over a certain period of time after the inquiry, it will be verified that there is no radio apparatus 10 operating in the base station mode within the communication system 100. The control unit 32 instructs a radio apparatus 10 having a high degree of priority to change the mode to the base station mode.

It is to be noted here that there are cases where there is no radio apparatus having a high degree of priority or the degrees of priority are undecided. In such a case, a plurality of radio apparatuses form an ad-hoc network. If the switching of the mode to the base station mode is conveyed by a predetermined radio apparatus 10 after the formation of the ad-hoc network, the control unit 32 will instruct said radio apparatus 10 to switch the mode to the base station mode. That is, after a radio apparatus 10 that has been operated in the base station mode withdraws from the communication system 100, the plurality of radio apparatuses 10 perform ad-hoc communications before the mode of one of the plurality of radio apparatus 10 is changed to the base station mode from the terminal mode. If a radio apparatus 10 the mode of which is to be changed from the terminal mode to the base station mode cannot be identified, the ad-hoc communication will continue.

An operation of the communication system 100 configured as above will now be described. FIG. 14 is a flowchart showing a setting procedure in the communication system 100 according to the exemplary embodiment of the present invention. The control unit 32 detects that a radio apparatus 10 operating in the AP mode has been withdrawn (S190). If there is a radio apparatus 10 having a high degree of priority (Y of S192), the control unit 32 will instruct said radio apparatus 10 to change the mode to the AP mode (S194). If there is no radio apparatus 10 having a high degree of priority (N of S192), the control unit 32 will form an ad-hoc network between its own radio apparatus 10 and the rest of other radio apparatuses 10 (S196). If there is a radio apparatus 10 capable of operating as the AP mode (Y of S198), the control unit 32 will instruct said radio apparatus 10 to change the mode to the AP mode (S200). If there is no radio apparatus 10 capable of operating as the AP mode (N of S198), the processing will be terminated.

By employing the present exemplary embodiment, the degrees of priority are predetermined. Thus, even if a radio apparatus operating in the base station mode has withdrawn from the communication system, a radio apparatus that is to newly operate in the base station mode can be determined at once. Also, since the radio apparatus that is to newly operate in the base station mode is determined promptly, the communication in the switching mode can be maintained. Also, the communication using the ad-hoc network is performed in the event that the radio apparatus that is to newly operate in the base station mode is not determined at once. This avoids the interruption of the ongoing communication. Also, since the interruption of the ongoing communication is avoided, degradation of user convenience can be prevented.

The present invention has been described based on the exemplary embodiment. This exemplary embodiment is intended to be illustrative only, and it is understood by those skilled in the art that various modifications to constituting elements and processes as well as arbitrary combinations thereof could be developed and that such modifications and combinations are also within the scope of the present invention.

DESCRIPTION OF THE REFERENCE NUMERALS

10 Radio apparatus
20 Antenna
22 Communication execution unit
24 Battery
26 Radio unit
28 Modem unit
30 Data processing unit
32 Control unit
34 Operating unit
36 IF unit
38 Storage
40 Detector
42 Fixed-mode receive unit
44 Switching-mode receive unit
46 Switching unit
48 Maintenance unit
60 Selector
62 Switching unit
70 Decision unit
100 Communication system

INDUSTRIAL APPLICABILITY

The present invention properly sets either one of a base station mode and a terminal mode in a radio apparatus having the two modes.

What is claimed is:

1. A radio apparatus for communicating with another radio apparatus, the radio apparatus comprising:
    a communication unit configured to select either one of a base station mode and a terminal mode so as to perform a communication using packet signals,
    the base station mode being such that a packet signal containing data indicating that an initial source and a final destination are not said own radio apparatus is to be communicated, and
    the terminal mode being such that a packet signal containing data indicating that the initial source or the final destination is said own radio apparatus is to be communicated; and
    a control unit configured to start said radio apparatus by setting said communication unit to the terminal mode, the control unit including:
    a detector configured to detect that the packet signal, which is sent from the another radio apparatus and which contains broadcast information, has been received via said communication unit before the predetermined duration of time has elapsed;
    a maintenance unit configured to maintain the setting of the terminal mode for said communication unit when the source of the packet signal detected by the detector is a radio apparatus compatible with the base station mode and the terminal mode; and
    a switching unit configured to switch the mode of said communication unit to the base station mode when the source of the packet signal detected by the detector is a radio apparatus compatible with the base station mode only,
    wherein when said control unit does not receive a packet signal, which is sent from the another radio apparatus and which contains broadcast information, via said communication unit before a predetermined duration of time has elapsed after the start of said radio apparatus, said control unit switches the mode of said communication unit to the base station mode.

2. A radio apparatus for communicating with another radio apparatus, the radio apparatus comprising:
    a communication unit configured to select either one of a base station mode and a terminal mode so as to perform a communication using packet signals, the base station mode being such that a packet signal containing data indicating that an initial source and a final destination are not said own radio apparatus is to be communicated, and the terminal mode being such that a packet signal containing data indicating that the initial source or the final destination is said own radio apparatus is to be communicated;

a control unit configured to control an operation related to the base station mode and the terminal mode in said communication unit; and a detector configured to detect a remaining amount of battery included in said radio apparatus, when said control unit sets said communication unit to the base station mode, wherein when the remaining amount of battery included in said radio apparatus has become lower than a threshold value, said detector notifies said control unit of the detection result, wherein when a notification is received from said detector, said control unit instructs the another radio apparatus to switch to the base station mode, via said communication unit, and said control unit instructs said communication unit to switch to the terminal mode.

3. A communication system, comprising:

a first network including a first radio apparatus and a plurality of first terminal apparatuses; and a second network including a second radio apparatus and a plurality of second terminal apparatuses, wherein said first radio apparatus and said second radio apparatus each has a base station mode and a terminal mode, and each selects the base station mode, the base station mode being such that a packet signal containing data indicating that an initial source and a final destination are not the own first or second radio apparatus itself is to be communicated, and the terminal mode being such that a packet signal containing data indicating that the initial source or the final destination is the own first or second radio apparatus itself is to be communicated, and wherein when at least one of the first radio apparatus and the second radio apparatus senses proximity of the other, the second radio apparatus integrates said second network into said first network by switching the base station mode to the terminal mode.

4. A communication system, comprising:

a first radio apparatus having a base station mode and a terminal mode, said first radio apparatus having selected the base station mode, the base station mode being such that a packet signal containing data indicating that an initial source and a final destination are not the own first radio apparatus is to be communicated, and the terminal mode being such that a packet signal containing data indicating that the initial source or the final destination is the own first radio apparatus is to be communicated;

a second radio apparatus having a base station mode and a terminal mode, said second radio apparatus having selected the terminal mode, the base station mode being such that a packet signal containing data indicating that an initial source and a final destination are not the own second radio apparatus is to be communicated, and the terminal mode being such that a packet signal containing data indicating that the initial source or the final destination is the own second radio apparatus is to be communicated; and a plurality of terminal apparatuses, wherein when the size of a network comprised of said first radio apparatus, said second radio apparatus and said plurality of terminal apparatuses becomes larger than a threshold value, said first radio apparatus instructs said second radio apparatus to switch the mode from the terminal mode to the base station mode, and instructs some of said plurality of terminal apparatuses and said second radio apparatus to form another network.

5. A communication system, comprising:

a first radio apparatus having a base station mode and a terminal mode, said first radio apparatus having selected the base station mode, the base station mode being such that a packet signal containing data indicating that an initial source and a final destination are not said own first radio apparatus is to be communicated, and the terminal mode being such that a packet signal containing data indicating that the initial source or the final destination is said own first radio apparatus is to be communicated; and a plurality of second radio apparatuses each having a base station mode and a terminal mode, said second radio apparatuses having selected the terminal mode, the base station mode being such that a packet signal containing data indicating that an initial source and a final destination are not the own second radio apparatus is to be communicated, and the terminal mode being such that a packet signal containing data indicating that the initial source or the final destination is the own second radio apparatus is to be communicated, wherein when said plurality of second radio apparatuses detect that said first radio apparatus has withdrawn from a network formed by said first radio apparatus and said plurality of second radio apparatuses, the mode of one of said plurality of second radio apparatuses is changed from the terminal mode to the base station mode.

6. A communication system according to claim 5, wherein after said first radio apparatus has withdrawn from the network, said plurality of second radio apparatuses perform an ad-hoc communication before the mode of one of said plurality of second apparatuses is changed to the base station mode from the terminal mode.

7. A communication system according to claim 5, wherein when one of said plurality of radio apparatuses whose mode is to be changed from the terminal mode to the base station mode is not identified, said plurality of second radio apparatuses perform an ad-hoc communication.

* * * * *

UNITED STATES PATENT AND TRADEMARK OFFICE
CERTIFICATE OF CORRECTION

PATENT NO.        : 8,665,787 B2  
APPLICATION NO. : 13/002620  
DATED             : March 4, 2014  
INVENTOR(S)       : Nagai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 437 days.

Signed and Sealed this

Twenty-ninth Day of September, 2015

Michelle K. Lee  
*Director of the United States Patent and Trademark Office*